US011520765B2

(12) United States Patent
Muramoto et al.

(10) Patent No.: US 11,520,765 B2
(45) Date of Patent: Dec. 6, 2022

(54) COMPUTER-READABLE RECORDING MEDIUM RECORDING INDEX GENERATION PROGRAM, INFORMATION PROCESSING APPARATUS AND SEARCH METHOD

(71) Applicant: FUJITSU LIMITED, Kawasaki (JP)

(72) Inventors: Takahide Muramoto, Zama (JP); Masahiro Kataoka, Kamakura (JP); Hitoshi Okumura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 229 days.

(21) Appl. No.: 16/591,761

(22) Filed: Oct. 3, 2019

(65) Prior Publication Data

US 2020/0034349 A1 Jan. 30, 2020

Related U.S. Application Data

(63) Continuation of application No. PCT/JP2017/014426, filed on Apr. 6, 2017.

(51) Int. Cl.

| | |
|---|---|
| *G06F 7/00* | (2006.01) |
| *G06F 16/22* | (2019.01) |
| *G06F 16/2458* | (2019.01) |
| *G06F 40/242* | (2020.01) |

(52) U.S. Cl.

CPC ...... *G06F 16/2272* (2019.01); *G06F 16/2237* (2019.01); *G06F 16/2465* (2019.01); *G06F 40/242* (2020.01)

(58) Field of Classification Search

CPC ............... G06F 16/2237; G06F 40/242; G06F 16/2465; G06F 16/2272

USPC ................... 707/739, 741, 999.003, 999.009

See application file for complete search history.

(56) References Cited

U.S. PATENT DOCUMENTS

| | | | | |
|---|---|---|---|---|
| 9,454,597 | B2 | 9/2016 | Kusumura et al. | |
| 2007/0168363 | A1 | 7/2007 | Inaba et al. | |
| 2008/0114757 | A1* | 5/2008 | Dejean | G06F 16/258 |
| 2008/0147601 | A1 | 6/2008 | Chapus et al. | |
| 2008/0235252 | A1* | 9/2008 | Sakai | G06F 16/81 |
| 2011/0225159 | A1* | 9/2011 | Murray | G06F 16/358 707/739 |

(Continued)

FOREIGN PATENT DOCUMENTS

| | | |
|---|---|---|
| EP | 2857986 A1 | 4/2015 |
| JP | 10-261969 | 9/1998 |

(Continued)

OTHER PUBLICATIONS

JPOA—Japanese Office Action dated Oct. 20, 2020 for corresponding Japanese Patent Application No. 2019-511028 with Machine Translation. ** Reference JP2008-146424 cited in JPOA was previously submitted in the IDS filed on Oct. 3, 2019.

(Continued)

*Primary Examiner* — Md I Uddin

(74) *Attorney, Agent, or Firm* — Fujitsu Patent Center

(57) ABSTRACT

A non-transitory computer-readable recording medium records an index generation program for causing a computer to execute processing of: inputting data which is described by a combination of an item and a value; and generating index information regarding an appearance position of each of the item and the value for each of the item and the value which are included in the data.

2 Claims, 36 Drawing Sheets

(56) References Cited

U.S. PATENT DOCUMENTS

2017/0019126 A1 1/2017 Kataoka et al.

FOREIGN PATENT DOCUMENTS

| | | | |
|---|---|---|---|
| JP | 2001-265773 | A | 9/2001 |
| JP | 2006-185408 | A | 7/2006 |
| JP | 2008-515061 | A | 5/2008 |
| JP | 2008-146424 | A | 6/2008 |
| JP | 2010-267081 | A | 11/2010 |
| JP | 2014-089646 | A | 5/2014 |
| WO | 2018/096686 | A1 | 5/2018 |

OTHER PUBLICATIONS

Anonymous: "Inverted index—Wikipedia", Jan. 9, 2016, XP055355061. Cited in EESR dated Feb. 27, 2020 for corresponding European Patent Application No. 17904680.0.
EESR—Extended European Search Report dated Feb. 27, 2020 for corresponding European Patent Application No. 17904680.0.
Shohei Yokoyama et al., "An XML Compressor by Simplified Element Name—Simplified Element XML-", IPSJ Symposium Series, vol. 2000, No. 14, pp. 331-337, Dec. 6, 2000 (9 pages) (Cited in ISR).
International Search Report and Written Opinion of the International Searching Authority (Form PCT/ISA/210, 220, and 237), mailed in connection with PCT/JP2017/014426 and dated Jun. 20, 2017 (12 pages).
EPOA—European Office Action dated Nov. 22, 2021 for corresponding European Patent Application No. 17904680.0. ** Reference EP2857986A1 cited in the EPOA was previously submitted in the IDS filed on May 18, 2020.

* cited by examiner

FIG. 2

XBRL DATA (DECOMPRESSED DATA)

BLOCK

| | |
|---|---|
| 1 | <xbrl> |
| 2 | ... |
| 3 | <context id="CurrentQ1"><entity><identifier scheme="http://www.tse.or.jp/sicc">67020</identifier></entity><period><instant>2016-06-30 </instant></period></context> |
| 4 | <context id="PriorQ1"><entity><identifier scheme="http://www.tse.or.jp/sicc">67020</identifier></entity><period><instant>2015-06-30 </instant></period></context> |
| 5 | ... |
| 6 | <unit id="JPY"><measure>iso4217:JPY</measure></unit> |
| 7 | <unit id="Pure"><measure>pure</measure></unit> |
| 8 | ... |
| 9 | <Sales contextRef="CurrentQ1" unitRef="JPY" decimals="0" >10000</Sales> |
| 10 | ... |
| 11 | <ChangeInSales contextRef="PriorQ1" unitRef="Pure" decimals="1">-0.3</ChangeInSales> |
| ... | ... |

| BLOCK No (121a) | ADDRESS IN XBRL DATA (121b) |
|---|---|
| 1 | 0 |
| 2 | A000h |
| 3 | A100h |
| 4 | A200h |
| ... | ... |
| n | ... |

X AXIS (BLOCK) →

Y AXIS ↓

| | UPPER INDEX | 1 | 2 | 3 | 4 | 5 | 6 | 7 | 8 | 9 | 10 | 11 | 12 | 13 | 14 | 15 | 16 | … |
|---|---|---|---|---|---|---|---|---|---|---|---|---|---|---|---|---|---|---|
| TAG LAYER | <xbrl> | 1 | 0 | 0 | 0 | 0 | 0 | 0 | 0 | 0 | 0 | 0 | 0 | 0 | 0 | 0 | 0 | 0 |
| | … | 0 | 0 | 0 | 0 | 0 | 0 | 0 | 0 | 0 | 0 | 0 | 0 | 0 | 0 | 0 | 0 | 0 |
| | <context> | 0 | 0 | 1 | 1 | 0 | 0 | 0 | 0 | 0 | 0 | 0 | 0 | 0 | 0 | 0 | 0 | 0 |
| | … | 0 | 0 | 0 | 0 | 0 | 0 | 0 | 0 | 0 | 0 | 0 | 0 | 0 | 0 | 0 | 0 | 0 |
| | <unit> | 0 | 0 | 0 | 0 | 0 | 1 | 1 | 0 | 0 | 0 | 0 | 0 | 0 | 0 | 0 | 0 | 0 |
| | … | 0 | 0 | 0 | 0 | 0 | 0 | 0 | 0 | 0 | 0 | 0 | 0 | 0 | 0 | 0 | 0 | 0 |
| | <Sales> | 0 | 0 | 0 | 0 | 0 | 0 | 0 | 0 | 1 | 0 | 0 | 0 | 0 | 0 | 0 | 0 | 0 |
| | … | 0 | 0 | 0 | 0 | 0 | 0 | 0 | 0 | 0 | 0 | 0 | 0 | 0 | 0 | 0 | 0 | 0 |
| | <ChangeInSales> | 0 | 0 | 0 | 0 | 0 | 0 | 0 | 0 | 0 | 0 | 1 | 0 | 0 | 0 | 0 | 0 | 0 |
| | … | 0 | 0 | 0 | 0 | 0 | 0 | 0 | 0 | 0 | 0 | 0 | 0 | 0 | 0 | 0 | 0 | 0 |

X AXIS (BLOCK UNIT OFFSET) →

Y AXIS ↓

| | LOWER INDEX | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|---|
| TAG LAYER | <context> | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | <entity> | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | <identifier> | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | </identifier> | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | </entity> | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | <period> | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| | <instant> | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 |
| | </instant> | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| | </period> | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| | </context> | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 |
| ATTRIBUTE LAYER | id="" | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | scheme="" | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| DATA VALUE LAYER | CurrentQ1 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | http://www.tse.or.jp/sicc | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 67020 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 2016-06-30 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |

FIG. 5B

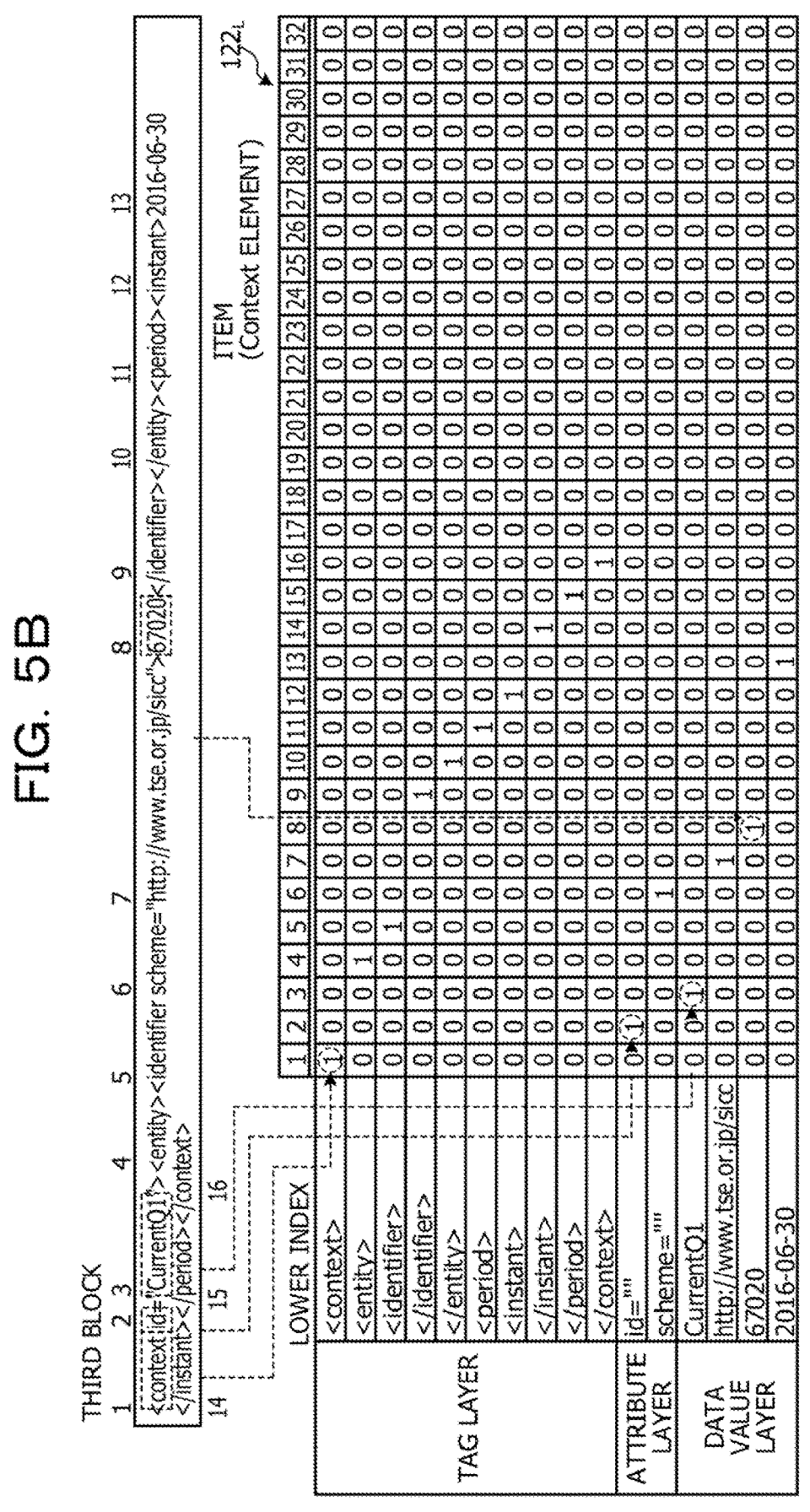

THIRD BLOCK 1 2 3 4 5 6 7 8 9 10 11 12 13

<context id="CurrentQ1"><entity><identifier scheme="http://www.tse.or.jp/sicc">67020</identifier></entity><period><instant>2016-06-30
</instant></period></context>

14 15 16

ITEM (Context ELEMENT)

122L

| | LOWER INDEX | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|---|
| TAG LAYER | <context> | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | <entity> | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | <identifier> | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | </identifier> | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | </entity> | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | <period> | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| | <instant> | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 |
| | </instant> | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| | </period> | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| | </context> | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 |
| ATTRIBUTE LAYER | id="" | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | scheme="" | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| DATA VALUE LAYER | CurrentQ1 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | http://www.tse.or.jp/sicc | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 67020 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 2016-06-30 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |

SIXTH BLOCK

| | 1 | 2 | 3 | 4 | 5 | 6 | 7 |
|---|---|---|---|---|---|---|---|
| | <unit id="JPY"> | <measure>iso4217:JPY</measure> | </unit> | | | | |

ITEM (unit ELEMENT) 122₄

| LOWER INDEX | 1 | 2 | 3 | 4 | 5 | 6 | 7 | 8 | 9 | 10 | 11 | 12 | 13 | 14 | 15 | 16 | ... |
|---|---|---|---|---|---|---|---|---|---|---|---|---|---|---|---|---|---|
| TAG LAYER <unit> | 1 | 0 | 0 | 0 | 0 | 0 | 0 | 0 | 0 | 0 | 0 | 0 | 0 | 0 | 0 | 0 | 0 |
| <measure> | 0 | 0 | 0 | 1 | 0 | 0 | 0 | 0 | 0 | 0 | 0 | 0 | 0 | 0 | 0 | 0 | 0 |
| </measure> | 0 | 0 | 0 | 0 | 0 | 1 | 0 | 0 | 0 | 0 | 0 | 0 | 0 | 0 | 0 | 0 | 0 |
| </unit> | 0 | 0 | 0 | 0 | 0 | 0 | 1 | 0 | 0 | 0 | 0 | 0 | 0 | 0 | 0 | 0 | 0 |
| ATTRIBUTE LAYER id="" | 0 | 1 | 0 | 0 | 0 | 0 | 0 | 0 | 0 | 0 | 0 | 0 | 0 | 0 | 0 | 0 | 0 |
| DATA VALUE LAYER JPY | 0 | 0 | 1 | 0 | 0 | 0 | 0 | 0 | 0 | 0 | 0 | 0 | 0 | 0 | 0 | 0 | 0 |
| iso4217:JPY | 0 | 0 | 0 | 0 | 1 | 0 | 0 | 0 | 0 | 0 | 0 | 0 | 0 | 0 | 0 | 0 | 0 |

| | LOWER INDEX | 1 | 2 | 3 | 4 | 5 | 6 | 7 | 8 | 9 | 10 | 11 | 12 | 13 | 14 | 15 | 16 | ... |
|---|---|---|---|---|---|---|---|---|---|---|---|---|---|---|---|---|---|---|
| TAG LAYER | <Sales> | 1 | 0 | 0 | 0 | 0 | 0 | 0 | 0 | 0 | 0 | 0 | 0 | 0 | 0 | 0 | 0 | 0 |
| | </Sales> | 0 | 0 | 0 | 1 | 0 | 0 | 0 | 0 | 0 | 0 | 0 | 0 | 0 | 0 | 0 | 0 | 0 |
| ATTRIBUTE LAYER | contextRef="" | 0 | 1 | 0 | 0 | 0 | 0 | 0 | 0 | 0 | 0 | 0 | 0 | 0 | 0 | 0 | 0 | 0 |
| | unitRef="" | 0 | 0 | 0 | 1 | 0 | 0 | 0 | 0 | 0 | 0 | 0 | 0 | 0 | 0 | 0 | 0 | 0 |
| | decimals="" | 0 | 0 | 0 | 0 | 0 | 1 | 0 | 0 | 0 | 0 | 0 | 0 | 0 | 0 | 0 | 0 | 0 |
| DATA VALUE LAYER | CurrentQ1 | 0 | 0 | 1 | 0 | 0 | 0 | 0 | 0 | 0 | 0 | 0 | 0 | 0 | 0 | 0 | 0 | 0 |
| | JPY | 0 | 0 | 0 | 0 | 1 | 0 | 0 | 0 | 0 | 0 | 0 | 0 | 0 | 0 | 0 | 0 | 0 |
| | 0 | 0 | 0 | 0 | 0 | 0 | 0 | 1 | 0 | 0 | 0 | 0 | 0 | 0 | 0 | 0 | 0 | 0 |
| | 10000 | 0 | 0 | 0 | 0 | 0 | 0 | 0 | 1 | 0 | 0 | 0 | 0 | 0 | 0 | 0 | 0 | 0 |

<Sales contextRef="CurrentQ1" unitRef="JPY" decimals="0" >10000</Sales>

→ X AXIS (BLOCK UNIT OFFSET)

| | LOWER INDEX | 1 | 2 | 3 |
|---|---|---|---|---|
| TAG LAYER | <Sales> | 1 | 0 | 0 |
| | </Sales> | 0 | 0 | 1 |
| ATTRIBUTE LAYER | contextRef="" | 1 | 0 | 0 |
| | unitRef="" | 1 | 0 | 0 |
| | decimals="" | 1 | 0 | 0 |
| DATA VALUE LAYER | CurrentQ1 | 1 | 0 | 0 |
| | JPY | 1 | 0 | 0 |
| | 0 | 1 | 0 | 0 |
| | 10000 | 0 | 1 | 0 |

1 2 3 4 5 6 7 8 9

<Sales contextRef="CurrentQ1" unitRef="JPY" decimals="0" >10000</Sales>

→ X AXIS (BLOCK UNIT OFFSET)

$122_L$

| | LOWER INDEX | 1 | 2 | 3 | 4 | 5 | 6 | 7 | 8 | 9 |
|---|---|---|---|---|---|---|---|---|---|---|
| TAG LAYER | <Sales> | 1 | 0 | 0 | 0 | 0 | 0 | 0 | 0 | 0 |
| | </Sales> | 0 | 0 | 0 | 1 | 0 | 0 | 0 | 0 | 1 |
| ATTRIBUTE LAYER | contextRef="" | 0 | 1 | 0 | 0 | 0 | 0 | 0 | 0 | 0 |
| | unitRef="" | 0 | 0 | 0 | 1 | 0 | 0 | 0 | 0 | 0 |
| | decimals="" | 0 | 0 | 0 | 0 | 0 | 1 | 0 | 0 | 0 |
| DATA VALUE LAYER | CurrentQ1 | 0 | 0 | 1 | 0 | 0 | 0 | 0 | 0 | 0 |
| | JPY | 0 | 0 | 0 | 0 | 1 | 0 | 0 | 0 | 0 |
| | 0 | 0 | 0 | 0 | 0 | 0 | 0 | 1 | 0 | 0 |
| | 10000 | 0 | 0 | 0 | 0 | 0 | 0 | 0 | 1 | 0 |

FIG. 11

SEARCH QUERY: SEARCH FOR id ATTRIBUTE VALUE OF context ELEMENT OF WHICH DATE IS "2016"

122U

X AXIS (BLOCK)

| UPPER INDEX | | 1 | 2 | 3 | 4 | 5 | 6 | 7 | 8 | 9 | 10 | 11 | 12 | 13 | 14 | 15 | 16 | ··· |
|---|---|---|---|---|---|---|---|---|---|---|---|---|---|---|---|---|---|---|
| TAG LAYER | <xbrl> | 1 | 0 | 0 | 0 | 0 | 0 | 0 | 0 | 0 | 0 | 0 | 0 | 0 | 0 | 0 | 0 | 0 |
| | ··· | 0 | 0 | 0 | 0 | 0 | 0 | 0 | 0 | 0 | 0 | 0 | 0 | 0 | 0 | 0 | 0 | 0 |
| | <context> | 0 | 0 | 1 | 1 | 0 | 0 | 0 | 0 | 0 | 0 | 0 | 0 | 0 | 0 | 0 | 0 | 0 |
| | ··· | 0 | 0 | 0 | 0 | 0 | 0 | 0 | 0 | 0 | 0 | 0 | 0 | 0 | 0 | 0 | 0 | 0 |
| | <unit> | 0 | 0 | 0 | 0 | 0 | 1 | 1 | 0 | 0 | 0 | 0 | 0 | 0 | 0 | 0 | 0 | 0 |
| | ··· | 0 | 0 | 0 | 0 | 0 | 0 | 0 | 0 | 0 | 0 | 0 | 0 | 0 | 0 | 0 | 0 | 0 |
| | <Sales> | 0 | 0 | 0 | 0 | 0 | 0 | 0 | 0 | 1 | 0 | 0 | 0 | 0 | 0 | 0 | 0 | 0 |
| | ··· | 0 | 0 | 0 | 0 | 0 | 0 | 0 | 0 | 0 | 0 | 0 | 0 | 0 | 0 | 0 | 0 | 0 |
| | <ChangeInSales> | 0 | 0 | 0 | 0 | 0 | 0 | 0 | 0 | 0 | 0 | 1 | 0 | 0 | 0 | 0 | 0 | 0 |
| | ··· | 0 | 0 | 0 | 0 | 0 | 0 | 0 | 0 | 0 | 0 | 0 | 0 | 0 | 0 | 0 | 0 | 0 |

122L

X AXIS (BLOCK UNIT OFFSET)

| LOWER INDEX | | 1 | 2 | 3 | 4 | 5 | 6 | 7 | 8 | 9 | 10 | 11 | 12 | 13 | 14 | 15 | 16 | ··· |
|---|---|---|---|---|---|---|---|---|---|---|---|---|---|---|---|---|---|---|
| TAG LAYER | <context> | 1 | 0 | 0 | 0 | 0 | 0 | 0 | 0 | 0 | 0 | 0 | 0 | 0 | 0 | 0 | 0 | 0 |
| | <entity> | 0 | 0 | 0 | 1 | 0 | 0 | 0 | 0 | 0 | 0 | 0 | 0 | 0 | 0 | 0 | 0 | 0 |
| | <identifier> | 0 | 0 | 0 | 0 | 1 | 0 | 0 | 0 | 0 | 0 | 0 | 0 | 0 | 0 | 0 | 0 | 0 |
| | </identifier> | 0 | 0 | 0 | 0 | 0 | 0 | 0 | 0 | 1 | 0 | 0 | 0 | 0 | 0 | 0 | 0 | 0 |
| | </entity> | 0 | 0 | 0 | 0 | 0 | 0 | 0 | 0 | 0 | 1 | 0 | 0 | 0 | 0 | 0 | 0 | 0 |
| | <period> | 0 | 0 | 0 | 0 | 0 | 0 | 0 | 0 | 0 | 0 | 1 | 0 | 0 | 0 | 0 | 0 | 0 |
| | <instant> | 0 | 0 | 0 | 0 | 0 | 0 | 0 | 0 | 0 | 0 | 0 | 1 | 0 | 0 | 0 | 0 | 0 |
| | </instant> | 0 | 0 | 0 | 0 | 0 | 0 | 0 | 0 | 0 | 0 | 0 | 0 | 0 | 1 | 0 | 0 | 0 |
| | </period> | 0 | 0 | 0 | 0 | 0 | 0 | 0 | 0 | 0 | 0 | 0 | 0 | 0 | 0 | 1 | 0 | 0 |
| | </context> | 0 | 0 | 0 | 0 | 0 | 0 | 0 | 0 | 0 | 0 | 0 | 0 | 0 | 0 | 0 | 1 | 0 |
| ATTRIBUTE LAYER | id="" | 0 | 1 | 0 | 0 | 0 | 0 | 0 | 0 | 0 | 0 | 0 | 0 | 0 | 0 | 0 | 0 | 0 |
| | scheme="" | 0 | 0 | 0 | 0 | 0 | 1 | 0 | 0 | 0 | 0 | 0 | 0 | 0 | 0 | 0 | 0 | 0 |
| DATA VALUE LAYER | CurrentQ1 | 0 | 0 | 1 | 0 | 0 | 0 | 0 | 0 | 0 | 0 | 0 | 0 | 0 | 0 | 0 | 0 | 0 |
| | http://www··· | 0 | 0 | 0 | 0 | 0 | 0 | 1 | 0 | 0 | 0 | 0 | 0 | 0 | 0 | 0 | 0 | 0 |
| | 67020 | 0 | 0 | 0 | 0 | 0 | 0 | 0 | 1 | 0 | 0 | 0 | 0 | 0 | 0 | 0 | 0 | 0 |
| | 2016-06-30 | 0 | 0 | 0 | 0 | 0 | 0 | 0 | 0 | 0 | 0 | 0 | 0 | 1 | 0 | 0 | 0 | 0 |

a1 a2 a3 a4 a5 a6 a7 a8

SEARCH QUERY: SEARCH FOR VALUE OF Sales ELEMENT
OF WHICH CONTEXT IS "CurrentQ1"

122_U

UPPER INDEX — X AXIS (BLOCK)

| | | 1 | 2 | 3 | 4 | 5 | 6 | 7 | 8 | 9 | 10 | 11 | 12 | 13 | 14 | 15 | 16 | ... |
|---|---|---|---|---|---|---|---|---|---|---|---|---|---|---|---|---|---|---|
| TAG LAYER | <xbrl> | 1 | 0 | 0 | 0 | 0 | 0 | 0 | 0 | 0 | 0 | 0 | 0 | 0 | 0 | 0 | 0 | |
| | ... | 0 | 0 | 0 | 0 | 0 | 0 | 0 | 0 | 0 | 0 | 0 | 0 | 0 | 0 | 0 | 0 | |
| | <context> | 0 | 0 | 1 | 1 | 0 | 0 | 0 | 0 | 0 | 0 | 0 | 0 | 0 | 0 | 0 | 0 | |
| | ... | 0 | 0 | 0 | 0 | 0 | 0 | 0 | 0 | 0 | 0 | 0 | 0 | 0 | 0 | 0 | 0 | |
| | <unit> | 0 | 0 | 0 | 0 | 0 | 1 | 1 | 0 | 0 | 0 | 0 | 0 | 0 | 0 | 0 | 0 | |
| | ...        b1 | 0 | 0 | 0 | 0 | 0 | 0 | 0 | 0 | 0 | 0 | 0 | 0 | 0 | 0 | 0 | 0 | |
| | <Sales> | 0 | 0 | 0 | 0 | 0 | 0 | 0 | 0 | 1 | 0 | 0 | 0 | 0 | 0 | 0 | 0 | |
| | ... | 0 | 0 | 0 | 0 | 0 | 0 | 0 | 0 | 0 | 0 | 0 | 0 | 0 | 0 | 0 | 0 | |
| | <ChangeInSales> | 0 | 0 | 0 | 0 | 0 | 0 | 0 | 0 | 0 | 0 | 1 | 0 | 0 | 0 | 0 | 0 | |
| | ... | 0 | 0 | 0 | 0 | 0 | 0 | 0 | 0 | 0 | 0 | 0 | 0 | 0 | 0 | 0 | 0 | |

122_L

LOWER INDEX  b2 — X AXIS (BLOCK UNIT OFFSET)

| | | 1 | 2 | 3 | 4 | 5 | 6 | 7 | 8 | 9 | 10 | 11 | 12 | 13 | 14 | 15 | 16 | ... |
|---|---|---|---|---|---|---|---|---|---|---|---|---|---|---|---|---|---|---|
| TAG LAYER | <Sales>    b6 | 1 | 0 | 0 | 0 | 0 | 0 | 0 | 0 | 1 | 0 | 0 | 0 | 0 | 0 | 0 | 0 | |
| | </Sales> | 0 | 0 | 0 | 0 | 0 | 0 | 0 | 0 | 1 | 0 | 0 | 0 | 0 | 0 | 0 | 0 | |
| ATTRIBUTE LAYER | contextRef="" | 0 | 1 | 0 | 0 | 0 | 0 | 0 | 0 | 0 | 0 | 0 | 0 | 0 | 0 | 0 | 0 | |
| | unitRef=""   b3 | 0 | 0 | 0 | 1 | 0 | 0 | 0 | 0 | 0 | 0 | 0 | 0 | 0 | 0 | 0 | 0 | |
| | decimals=""  b4 | 0 | 0 | 0 | 0 | 0 | 1 | 0 | 0 | 0 | 0 | 0 | 0 | 0 | 0 | 0 | 0 | |
| DATA VALUE LAYER | CurrentQ1 | 0 | 0 | 1 | 0 | 0 | 0 | 0 | 0 | 0 | 0 | 0 | 0 | 0 | 0 | 0 | 0 | |
| | JPY         b5 | 0 | 0 | 0 | 0 | 1 | 0 | 0 | 0 | 0 | 0 | 0 | 0 | 0 | 0 | 0 | 0 | |
| | 0 | 0 | 0 | 0 | 0 | 0 | 0 | 1 | 0 | 0 | 0 | 0 | 0 | 0 | 0 | 0 | 0 | |
| | 10000 | 0 | 0 | 0 | 0 | 0 | 0 | 0 | 1 | 0 | 0 | 0 | 0 | 0 | 0 | 0 | 0 | | b8  b7

FIG. 17

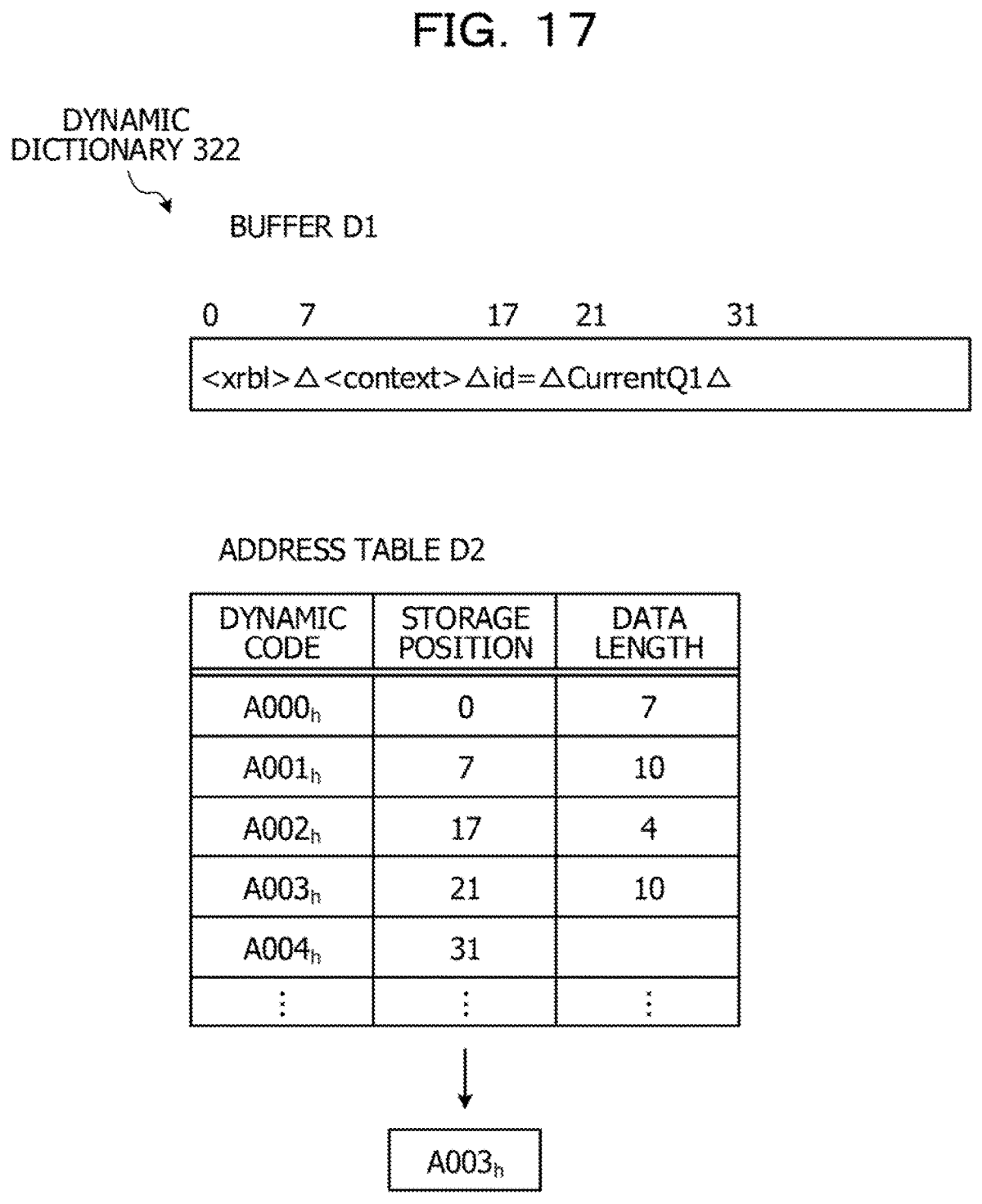

DYNAMIC DICTIONARY 322

BUFFER D1

0 7 17 21 31

<xrbl>△<context>△id=△CurrentQ1△

ADDRESS TABLE D2

| DYNAMIC CODE | STORAGE POSITION | DATA LENGTH |
|---|---|---|
| $A000_h$ | 0 | 7 |
| $A001_h$ | 7 | 10 |
| $A002_h$ | 17 | 4 |
| $A003_h$ | 21 | 10 |
| $A004_h$ | 31 | |
| ⋮ | ⋮ | ⋮ |

| BLOCK No. (121a) | ADDRESS IN ENCODED DATA (121c) |
|---|---|
| 1 | 0 |
| 2 | 201 |
| 3 | 355 |
| 4 | 521 |
| ... | ... |
| n | 85231 |

FIG. 19C

CurrentQ1 67020 id= 122L

| | LOWER INDEX | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|---|
| TAG LAYER | xxx1$_h$ (<context>) | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | xxxx (<entity>) | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | xxxx (<identity>) | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | xxxx (</identity>) | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | xxxx (</entity>) | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | xxxx (<period>) | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| | xxxx (<instant>) | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 |
| | xxxx (</instant>) | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| | xxxx (</period>) | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| | xxxx (</context>) | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 |
| ATTRIBUTE LAYER | xx20$_h$ (id="") | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | xxxx (scheme="") | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| DATA VALUE LAYER | A000$_h$ (CurrentQ1) | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | xxxx (http://www.tse.or.jp/sicc) | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | A002$_h$ (67020) | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | xxxx (2016-06-30) | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |

COMPUTER-READABLE RECORDING MEDIUM RECORDING INDEX GENERATION PROGRAM, INFORMATION PROCESSING APPARATUS AND SEARCH METHOD

CROSS-REFERENCE TO RELATED APPLICATION

This application is a continuation application of International Application PCT/JP2017/014426 filed on Apr. 6, 2017 and designated the U.S., the entire contents of which are incorporated herein by reference.

FIELD

The embodiment relates to an index generation program and the like.

BACKGROUND

Financial information is reported in the eXtensible Business Reporting Language (XBRL) documents around the world including Japan. The XBRL is an XML-based language which is standardized to create, distribute, and use information for various financial reports. The XBRL document is a structured document described in the XBRL, for example, about for accounting reports.

Related art is disclosed in Japanese Laid-open Patent Publication No. 2001-265773.

SUMMARY

According to an aspect of the embodiments, a non-transitory computer-readable recording medium records an index generation program for causing a computer to execute processing of: inputting data which is described by a combination of an item and a value; and generating index information regarding an appearance position of each of the item and the value for each of the item and the value which are included in the data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of XBRL data according to the first embodiment.

FIG. 3 is a diagram illustrating an example of a block table according to the first embodiment.

FIGS. 4A and 4B are a diagram illustrating an example of index information according to the first embodiment.

FIG. 5B is a diagram illustrating an example of a flow of index generation processing of a lower index according to the first embodiment.

FIG. 8 is a diagram for explaining how to allocate offsets of the lower index.

FIG. 11 is a diagram illustrating an example of a flow of offset search processing according to the first embodiment.

FIG. 17 is a diagram illustrating an example of a dynamic dictionary according to the second embodiment.

FIG. 18 is a diagram illustrating an example of a block table according to the second embodiment.

FIGS. 19B and 19C are a diagram illustrating an example of a flow of index generation processing of a lower index according to the second embodiment.

DESCRIPTION OF EMBODIMENTS

A search condition used to search for the data described in the XBRL is defined by, for example, a combination of an item and a value.

Structured search while specifying an element and character string search in element contents included in the search condition used to search the structured document are performed. Such a technique includes a unit for storing a positional relationship between the respective elements in the structured document and a unit for storing positional information of a character string that appears in each element, and these two pieces of information is combined or coupled by the positional information regarding the element and is processed as a single piece of index information.

However, a disadvantage of a case of the search on the structured document such as the XBRL data by using a search condition combining an item and a value is an amount of calculation.

For example, in the technology for searching on the structured document, positions of elements corresponding to the items and element contents corresponding to the values are indexed. However, in such a technique, in a case where the search is performed by using the search condition combining a specific element and specific element content, the following processing is executed. That is, in such a technique, the specific element is searched by using the positional relationship between the respective elements, and the specific element content of the searched specific element is referred by using the positional information of the character string that appears in each element which is individually stored. Therefore, a disadvantage of a case where the search on the structured document is performed by using a search condition combining the element and the element content is an amount of calculation.

An efficient search on a structured document by using a search condition combining an item and a value may be performed.

Hereinafter, embodiments of an index generation program, an index generation device, an index generation method, a search program, a search device, and a search method disclosed in the present application will be described in detail based on the drawings. Note that the present invention is not limited to the embodiments.

First Embodiment

Figure 26:
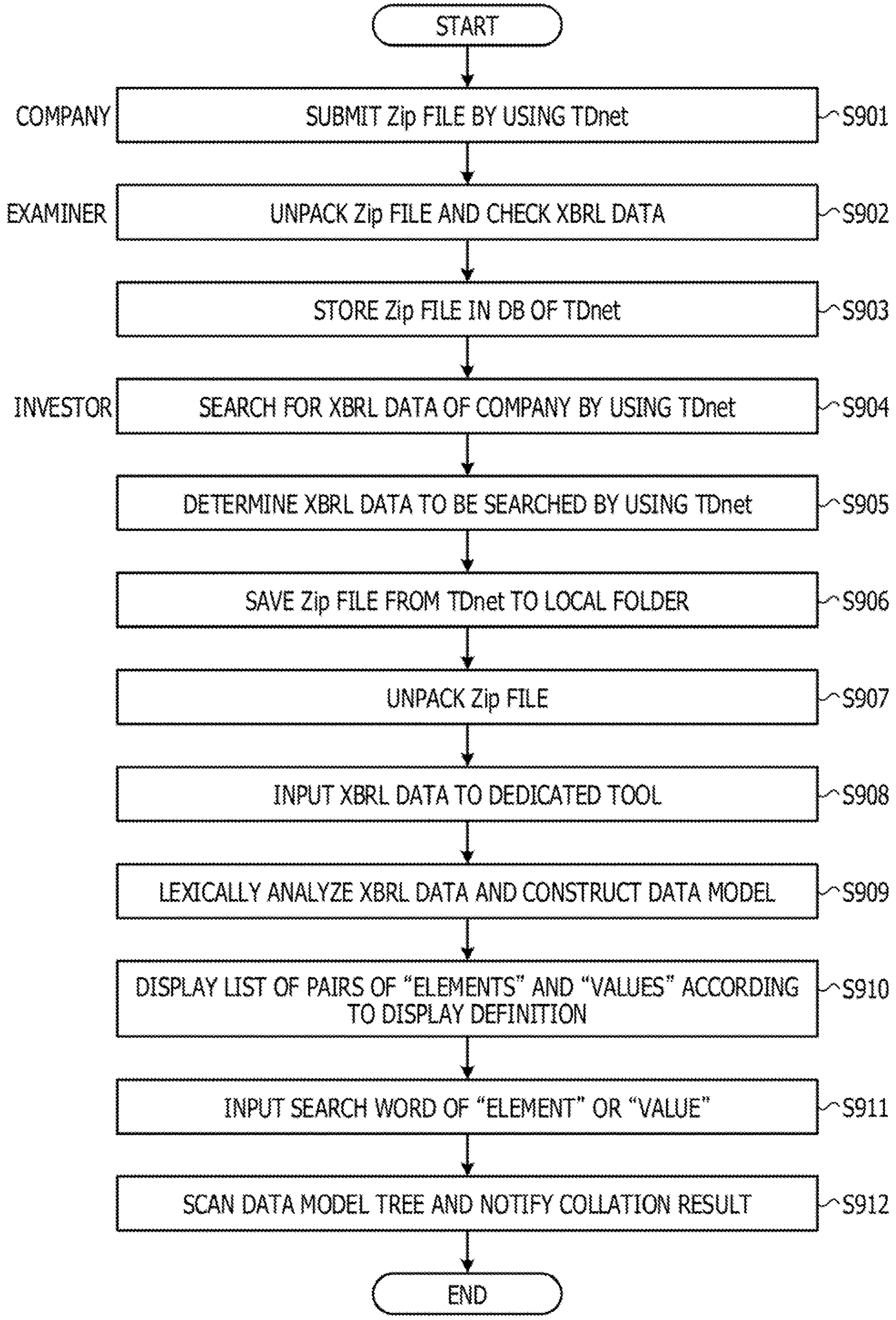
FIG. 26 is a diagram illustrating a reference example of a search flow using the TDnet.

First, there is a system called Timely Disclosure network (TDnet) that searches for financial information in XBRL documents for each company. By using the TDnet, the financial information in the XBRL documents submitted by the companies can be disclosed to investors, and the investor can search for the disclosed financial information. Here, a reference example of a search flow using the TDnet will be described with reference to FIG. 26. FIG. 26 is a diagram illustrating the reference example of the search flow using the TDnet.

As illustrated in FIG. 26, a company submits a Zip file obtained by compressing XBRL data of financial information by Zip by using the TDnet (S901).

An examiner unpacks (decompress) the Zip file and checks the decompressed XBRL data (S902). The examiner stores the Zip file of the approved XBRL data in a DataBase (DB) of the TDnet (S903) and discloses the XBRL data. The examiner here is, for example, a public supervisory body or a stock exchange.

An investor inputs a search period of a report date and a company name of a search target in order to search for disclosed XBRL data of the company by using the TDnet (S904). The investor determines XBRL data of a search target by using the TDnet (9905). The investor saves a Zip file for the determined XBRL data of the search target in a local folder by using the TDnet (S906). Then, the investor unpacks (decompress) the saved Zip file (S907).

Subsequently, the investor inputs the decompressed XBRL data to a dedicated tool (S908). The dedicated tool lexically analyzes the input XBRL data and constructs a data model tree (S909), Then, the dedicated tool displays a list of pairs of elements and values according to a display definition (S910).

Then, the investor inputs a search word of an element to be searched or a search word of a value to be searched (S911). An example of the search word of the element is "sales and revenues" which is an account title. As an example of the search word of the value, "president" is exemplified. Then, the dedicated tool scans the data model tree and notifies a result of collation with the search word (S912). For example, in a case where the search word of the element is the "sales and revenues", a value corresponding to the account title "sales and revenues" is notified. In a case where the search word of the value is the "president", a value of the account title including the "president" is notified.

Figure 27:
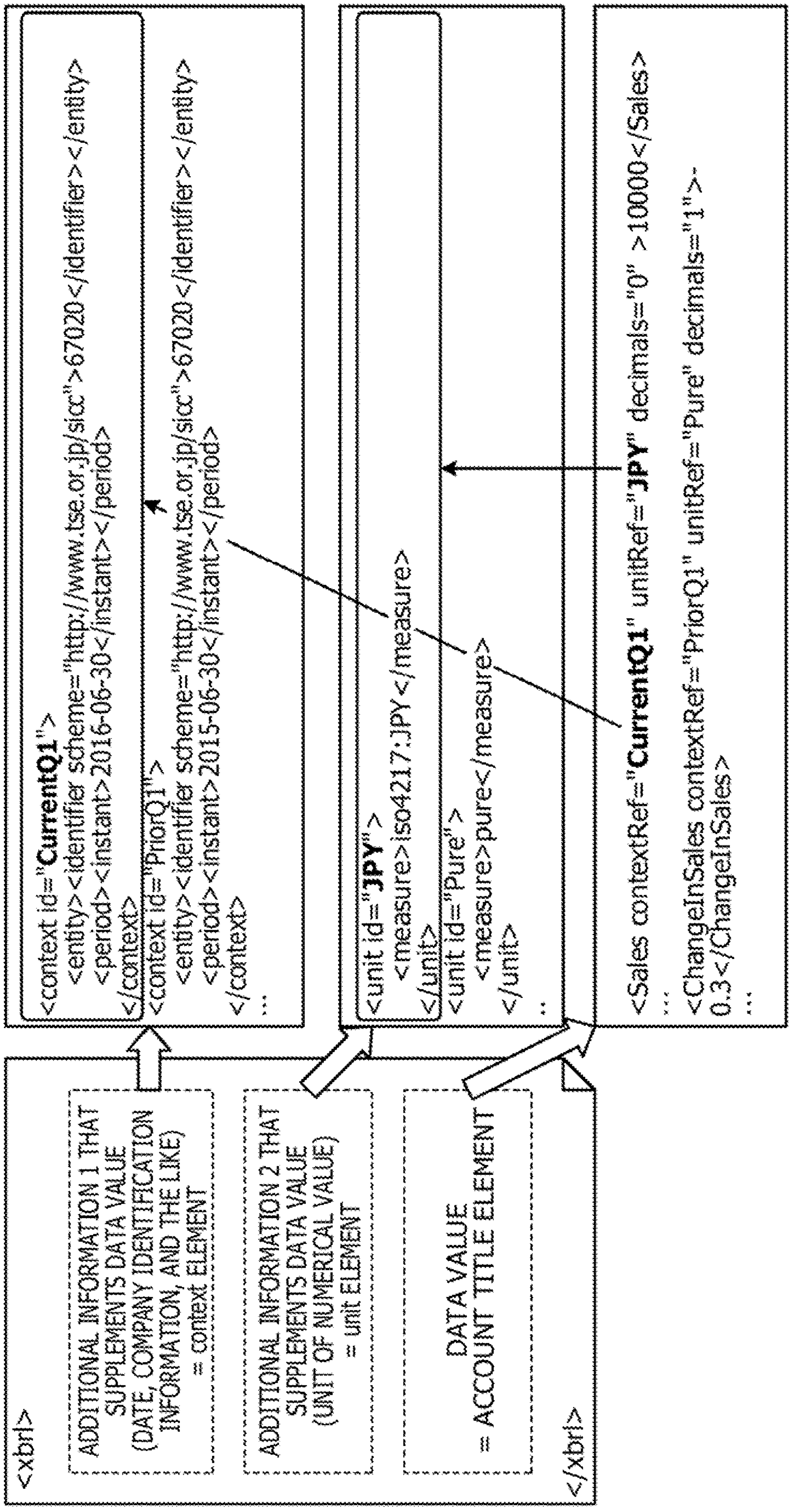
FIG. 27 is a diagram illustrating an example of XBRL data.

Here, an example of the XBRL data will be described with reference to FIG. 27. FIG. 27 is a diagram illustrating an example of the XBRL data.

As illustrated in FIG. 27, a single piece of XBRL data includes a data value and additional information that supplements the data value. The additional information is information specified by another independent element associated with the element including the data value. The additional information is defined as a plurality of elements having the names of context and unit. Here, as context names for distinguishing the context, "CurrentQ1" and "PriorQ1" are applied. As unit names for distinguish units, "JPY" and "Pure" are applied. In the data value, with respect to an element of which the name is Sales, a context name "CurrentQ1" and a unit name "JPY" are defined as attributes to refer to the additional information. Then, as the value of the element "Sales", "1000" is defined. Furthermore, in additional information corresponding to the context name "CurrentQ1", "2016-06-30" is defined as a value of an element "instant" subordinate to an element "period" which means a date of the report date.

Figure 28:
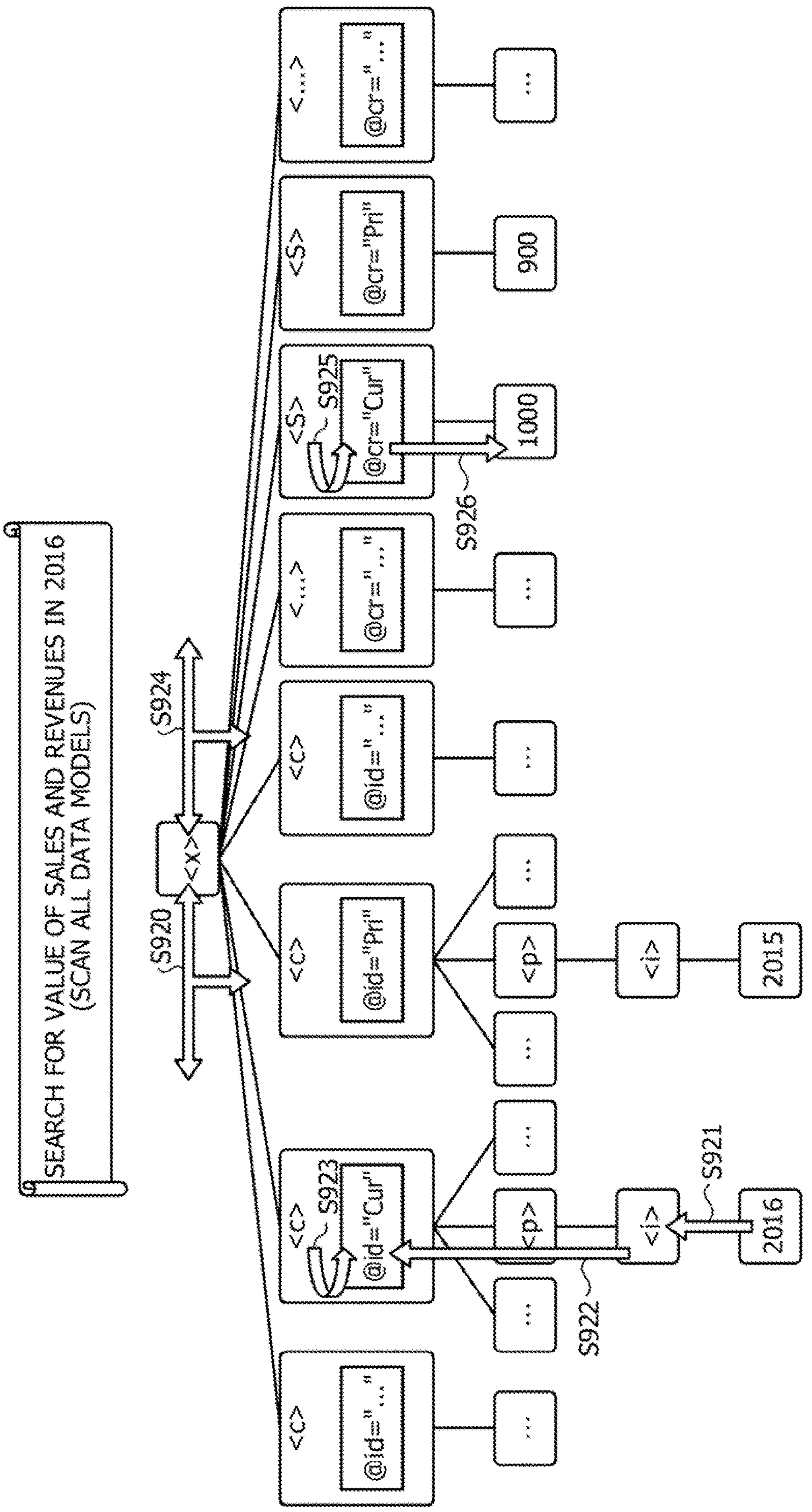
FIG. 28 is a diagram illustrating a reference example of the search processing.

Here, a reference example of search processing in a case where the investor inputs "sales and revenues" in "2016" as the search words of the element to be searched will be described with reference to FIG. 28. FIG. 28 is a diagram illustrating a reference example of the search processing. In FIG. 28, it is assumed that a data model tree regarding the XBRL data input to the dedicated tool be constructed. "C" in <c>, "p" in <p>, and "i" in <i> in the tree are respectively abbreviations of "context", "period", and "instant". In addition, "S" in <S> and "cr=" in the tree are respectively abbreviations of "Sales" and "contextRef=". Furthermore, "Cur" and "Pri" in the tree are respectively abbreviations of "CurrentQ1" and "PriorQ1". In addition, "2016" and "2015" in the tree are respectively abbreviations of "2016-06-30" and "2015-06-30".

As illustrated in FIG. 28, the dedicated tool which has received the search word "sales and revenues" in "2016" searches for the element including "2016" as a value from the top (root) to an end of the tree (S920). Then, as a result of the search, the dedicated tool confirms that a parent element is "instant" (S921) and searches ancestors for the "context" element (S922). Then, the dedicated tool confirms that an ancestor element is the "context" element and searches for an id attribute (S923), It is assumed that an id attribute value be "CurrentQ1" as a result of the search.

Subsequently, the dedicated tool searches for a "contextRef" attribute having "CurrentQ1" as a value from the top (root) to the end of the tree (S924). Then, the dedicated tool confirms that "CurrentQ1" is the value of the "contextRef" attribute as a result of the search and confirms that the "contextRef" attribute is an attribute of the "Sales" element indicating "sales and revenues" (S925). Then, the dedicated tool acquires "1000" as a value of the "Sales" element (S926).

In this way, in the search processing according to the reference example, the data value and the additional information are separated according to the XBRL-specific specification. Therefore, since the search word is collated to all the data in the data model tree of the XBRL data at various times while scanning all the data, an increase in the calculation amount is expected, and it is difficult to efficiently search.

[Configuration of Index Generation Device According to First Embodiment]

Figure 1:
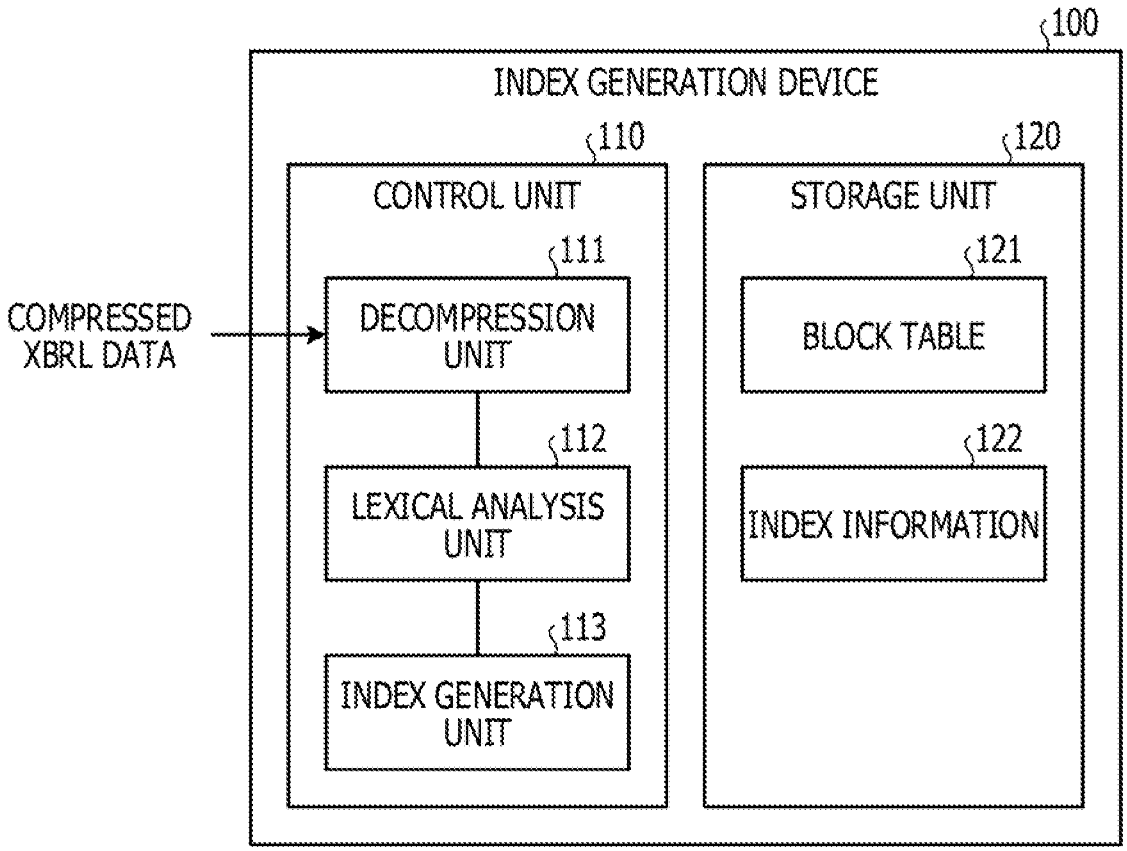
FIG. 1 is a functional block diagram illustrating a configuration of an index generation device according to a first embodiment.

FIG. 1 is a functional block diagram illustrating a configuration of an index generation device according to a first embodiment. The index generation device 100 inputs XBRL data described by a combination of an item and a value and generates index information 122 regarding appearance positions of each of the item and the value for each of the item and the value included in the input XBRL data.

The XBRL data here is data described in the XBRL data which is decompressed from compressed data. The XBRL is an XML-based language which is standardized to create, distribute, and use information for various financial reports. Then, as an example of the compressed data, data in a Zip format is exemplified. As an example of the XBRL data, financial data is exemplified.

Here, an example of the XBRL data according to the first embodiment will be described with reference to FIG. 2. FIG. 2 is a diagram illustrating an example of the XBRL data according to the first embodiment. The XBRL data illustrated in FIG. 2 has the same content as the XBRL data illustrated in FIG. 27.

As illustrated in FIG. 2, the XBRL data is divided into blocks from the beginning for each element indicating the additional information and the data value. Here, elements in the third and fourth blocks correspond to additional information 1 that supplements the data value illustrated in FIG. 27. Elements in the sixth and seventh blocks correspond to additional information 2 that supplements the data value illustrated in FIG. 27, Elements in the ninth and eleventh blocks correspond to the data value illustrated in FIG. 27. A relation between a start tag of each element indicating the additional information and the data value in the XBRL data and a block is defined by a block table 121 to be described later.

As illustrated in FIG. 1, the index generation device 100 includes a control unit 110 and a storage unit 120.

The storage unit 120 corresponds to a storage device such as a non-volatile semiconductor memory element, for example, a Flash Memory, a Ferroelectric Random Access Memory (FRAM) (registered trademark), and the like. The storage unit 120 includes the block table 121 and the index information 122.

The block table 121 stores an address of the start tag of each element indicating the additional information and the data value in the XBRL data and a block number in association with each other.

Here, an example of the block table 121 will be described with reference to FIG. 3. FIG. 3 is a diagram illustrating an example of a block table according to the first embodiment. As illustrated in FIG. 3, the block table 121 stores a block number 121*a* and an address 121*b* in the XBRL data in association with each other. The block number 121*a* indicates a block number. The address 121*b* in the XBRL data indicates a leading address of a block included in the XBRL data decompressed from the compressed data. As an example, in a case where the block number 121*a* is "1", "O" is stored as the address 121*b* in the XBRL data. In a case where the block number 121*a* is "2", "A000h" is stored as the address 121*b* in the XBRL data.

Returning to FIG. 1, the index information 122 includes index information $\mathbf{122}_U$ of an upper index and index information $\mathbf{122}_L$ of a lower index. The index information $\mathbf{122}_U$ of the upper index is information indicating a block position of each element indicating the additional information and the data value in the XBRL data. That is, the index information $\mathbf{122}_U$ of the upper index is a bitmap in which presence/absence of the start tag of the additional information and the data value in the XBRL data for each block position is indexed. The index information $\mathbf{122}_L$ of the lower index exists for each block. The index information $\mathbf{122}_L$ of the lower index of a predetermined block is information indicating appearance positions of each of items (start tag, attribute, and end tag) and a value regarding the elements indicating the additional information and the data value in the XBRL data. That is, the index information $\mathbf{122}_L$ of the lower index is a bitmap in which presence/absence of the item (start tag, attribute, and end tag) and the value in the predetermined block included in the XBRL data for each offset (appearance position) is indexed.

Here, an example of the index information 122 will be described with reference to FIGS. 4A and 4B. FIGS. 4A and 4B are a diagram illustrating an example of index information according to the first embodiment. In the upper diagram in FIGS. 4A and 4B, the index information $\mathbf{122}_U$ of the upper index is illustrated. In the lower diagram in FIGS. 4A and 4B, the index information $\mathbf{122}_L$ of the lower index is illustrated. The index information 122 in the upper diagram in FIGS. 4A and 4B is the index information $\mathbf{122}_U$ of the upper index with respect to the XBRL data illustrated in FIG. 2. The index information 122 in the lower diagram in FIGS. 4A and 4B is the index information $\mathbf{122}_L$ of the lower index of the third block in the XBRL data illustrated in FIG. 2.

As illustrated in the upper diagram in FIGS. 4A and 4B, the X axis of the index information $\mathbf{122}_U$ of the upper index indicates a block number, and the Y axis indicates a tag name (element name) of a tag layer. The index information $\mathbf{122}_U$ is information including a bundle of indexes regarding the block for each element name. Regarding each element name, in a block number where the element appears, ON, that is, "1" in the binary system is set. As an example, regarding <xrbl>, "1" is set at a first position of the block number. That is, the <xrbl> element is located in the first block. Regarding <context>, "1" is set at a third position of the block number. That is, the <context> element is located in the third block.

As illustrated in the lower diagram in FIGS. 4A and 4B, the X axis of the index information $\mathbf{122}_L$ of the lower index indicates an offset (appearance position) in block units, and the Y axis indicates a tag name included in the tag layer, an attribute name included in an attribute layer, and an element value and an attribute value included in a data value layer. Furthermore, the index information $\mathbf{122}_L$ has a region of the tag layer, a region of the attribute layer, and a region of the data value layer. The index information in the region of the tag layer is information of a bundle of indexes regarding appearance positions of tag names of each of the start tag and the end tag in the block. The index information 122 in the region of the attribute layer is information of a bundle of indexes regarding the appearance position of each attribute name in the block. The index information 122 in the region of the data value layer is information of a bundle of indexes regarding the appearance position of each of the element value and the attribute value in the block. At the appearance positions where each tag name, each attribute name, each element value, and each attribute value appear in the block, ON, that is, "1" in the binary system is set. As an example, in a case where the tag name of the start tag is "<context>", "1" is set at the first appearance position in the block. In a case where the attribute name is "id=", "1" is set at the second appearance position in the block. In a case where a value of the identifier element is "67020", "1" is set at the eighth appearance position in the block.

Returning to FIG. 1, the control unit 110 includes an internal memory for storing a program and control data for specifying various processing procedures and executes various processing by using the stored data. Then, the control unit 110 corresponds to an electronic circuit of an integrated circuit, for example, an Application Specific Integrated Circuit (ASIC), a Field Programmable Gate Array (FPGA), and the like. Alternatively, the control unit 110 corresponds to an electronic circuit such as a Central Processing Unit (CPU) and a Micro Processing Unit (MPU). The control unit 110 includes a decompression unit 111, a lexical analysis unit 112, and an index generation unit 113. The decompression unit 111 is an example of an input unit. The lexical analysis unit 112 and the index generation unit 113 are examples of a generation unit.

The decompression unit 111 receives and decompresses compressed XBRL data. The compressed XBRL data here is, for example, data obtained by compressing the XBRL data submitted by a company in the Zip format.

The lexical analysis unit 112 lexically analyzes XBRL data decompressed by the decompression unit 111. The term "lexical analysis" here means that the XBRL data is divided into markups and words.

The index generation unit 113 generates the index information 122 regarding the appearance positions of each of the items and the values for each of the item and the value included in the XBRL data. For example, the index generation unit 113 sets a bit at the appearance position of the tag name in the block with respect to the tag name of the start tag at the head of each block in the XBRL data. That is, the index generation unit 113 generates the index information $\mathbf{122}_U$ of the upper index. Then, the index generation unit 113 stores the block number 121*a* and the address 121*b* in the XBRL data in association with each other in the block table 121 for each block. Furthermore, the index generation unit 113 sets a bit at the appearance position of the tag name in the block with respect to the tag names of the start tag and the end tag included in the block, for each block in the XBRL data. The index generation unit 113 sets a bit at the appearance position of the attribute name in the block with respect to the attribute name included in the block, for each block in the XBRL data. The index generation unit 113 sets a bit at the appearance position of each value in the block with respect to the element value and the attribute value included in the block, for each block in the XBRL data. That is, the index generation unit 113 generates the index information $\mathbf{122}_L$ of the lower index. At the time of search, the index generation unit 113 may generate the index information $\mathbf{122}_L$ of the lower index after determining the block in the index information $\mathbf{122}_L$. Hereinafter, a case where the tag name of the tag layer and the like is registered when the index generation unit 113 generates the index information 122 will be described.

[Flow of Index Generation Processing]

Here, examples of flows of the index generation processing according to the first embodiment will be described with reference to FIGS. 5A and 5B.

Figure 5A:
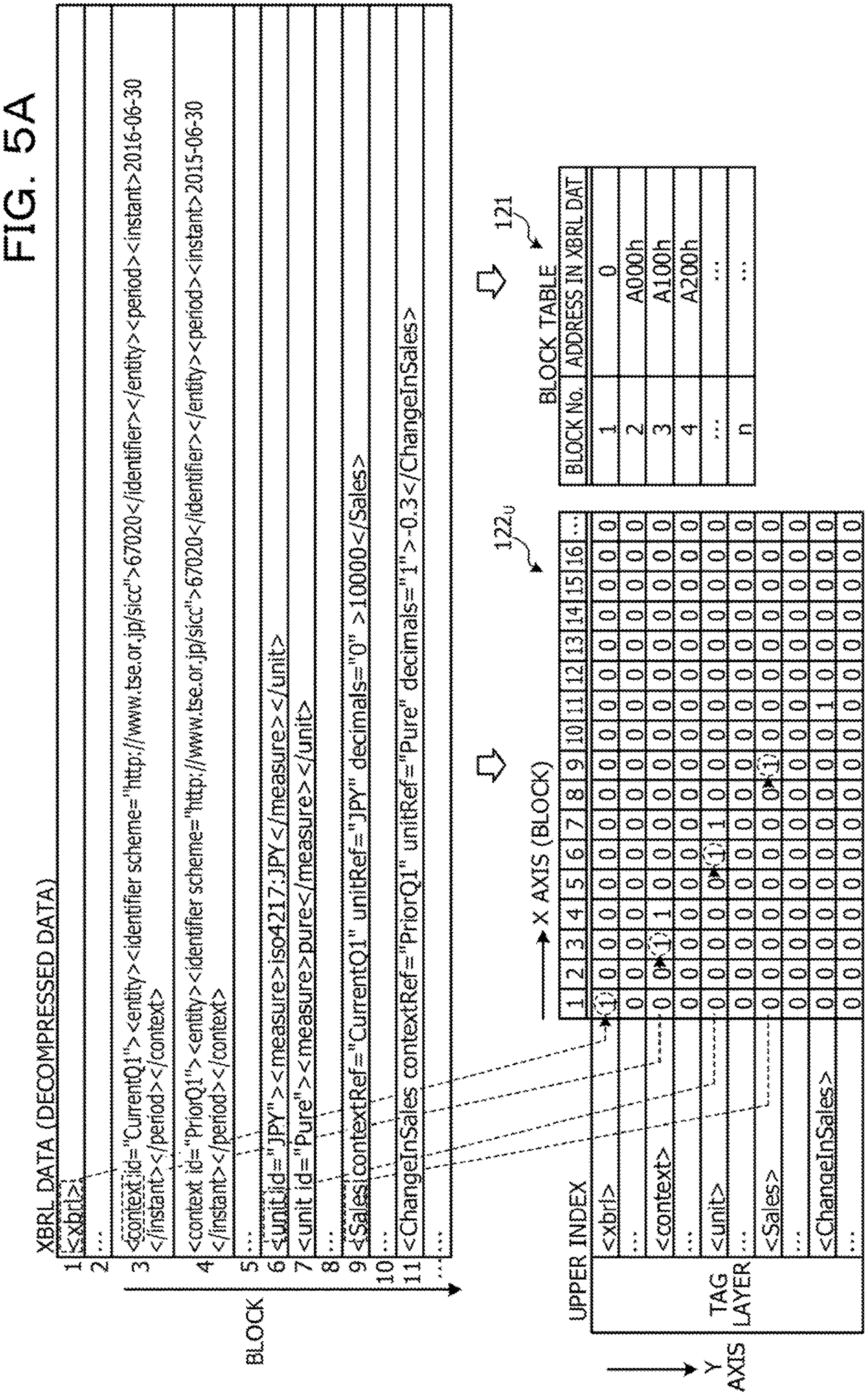
FIG. 5A is a diagram illustrating an example of a flow of index generation processing of an upper index according to the first embodiment.

FIG. 5A is a diagram illustrating an example of a flow of index generation processing of the upper index according to the first embodiment. As illustrated in FIG. 5A, the index generation unit 113 sets a bit at a block appearance position of the tag name in the block with respect to the tag name of the start tag of each block in the XBRL data. Here, the index generation unit 113 selects a block from the XBRL data. Then, the index generation unit 113 detects a start tag of the selected block and registers a tag name of the detected start tag to the tag layer. Then, the index generation unit 113 sets a bit at the appearance position of the tag name in the block to "1" (ON) with respect to the tag name of the start tag.

As an example, in a case where the index generation unit 113 selects the first block, a tag name "xbrl" of a start tag detected in the first block is registered to the tag layer. Then, the index generation unit 113 writes "1" in the bit corresponding to the block number "1" in the index (bitmap) corresponding to the tag name "xbrl".

As an example, in a case where the index generation unit 113 selects the third block, a tag name "<context>" of a start tag detected in the third block is registered to the tag layer. Then, the index generation unit 113 writes "1" in the bit corresponding to the block number "3" in the index (bitmap) corresponding to the tag name "<context>".

As an example, in a case where the index generation unit 113 selects the sixth block, a tag name "<unit>" of a start tag detected in the sixth block is registered to the tag layer. Then, the index generation unit 113 writes "1" in the bit corresponding to the block number "6" in the index (bitmap) corresponding to the tag name "<unit>".

As an example, in a case where the index generation unit 113 selects the ninth block, a tag name "<Sales>" of a start tag detected in the ninth block is registered to the tag layer. Then, the index generation unit 113 writes "1" in the bit corresponding to the block number "9" in the index (bitmap) corresponding to the tag name "<Sales>".

Furthermore, the index generation unit 113 stores the block number 121*a* and the address 121*b* in the XBRL data in association with each other in the block table 121 for each block. Here, the index generation unit 113 stores a block number "1" and an address "0" in the XBRL data in association with each other in the block table 121, The index generation unit 113 stores a block number "2" and an address "A000h" in the XBRL data in association with each other in the block table 121. The index generation unit 113 stores a block number "3" and an address "A100h" in the XBRL data in association with each other in the block table 121. The index generation unit 113 stores a block number "4" and an address "A200h" in the XBRL data in association with each other in the block table 121.

FIG. 5B is a diagram illustrating an example of a flow of index generation processing of the lower index according to the first embodiment. Here, processing for generating a lower index in a third block in the XBRL data will be described. In the third block, a lower index of the context element is generated.

As illustrated in FIG. 58, in a case where the index generation unit 113 detects the start tag in the third block, a tag name "<context>" of the start tag is registered to the tag layer. The tag name means an element name. Then, the index generation unit 113 writes "1" in a bit corresponding to an appearance position "1" in an index (bitmap) corresponding to the tag name "<context>" of the start tag. It is preferable that the index generation unit 113 detect the tag name as follows. That is, it is preferable that, when detecting a tag start symbol "<", the index generation unit 113 detect a word immediately after the start symbol as a tag name.

In a case where "id=" is detected as an attribute name, the index generation unit 113 registers the attribute name "id=" to the attribute layer. Then, the index generation unit 113 writes "1" in a bit corresponding to an appearance position "2" in an index (bitmap) corresponding to the attribute name "id=". It is sufficient that the index generation unit 113 detect the attribute name as follows. That is, it is preferable that the index generation unit 113 detect an attribute group subsequent to the tag name, that is, a left-hand side of an attribute having "=" as the attribute name.

When detecting "CurrentQ1" as the attribute value, the index generation unit 113 registers the attribute value "CurrentQ1" to the data value layer. Then, the index generation unit 113 writes "I" in a bit corresponding to an appearance position "3" in an index (bitmap) corresponding to the attribute value "CurrentQ1". It is sufficient that the index generation unit 113 detect the attribute value as follows. That is, it is preferable that the index generation unit 113 similarly detect a right-hand side of the attribute having "=" as the attribute value.

When detecting "67020" as the element value, the index generation unit 113 registers the element value "67020" to the data value layer. Then, the index generation unit 113 writes "1" in a bit corresponding to an appearance position "8" in an index (bitmap) corresponding to the element value "67020". It is sufficient that the index generation unit 113 detect the element value as follows. That is, it is preferable that the index generation unit 113 detect a text between an end symbol ">" of the start tag and the start symbol "<" of the end tag as the element value.

In this way, it is preferable that the index generation unit 113 sequentially detect the tag name of the start tag, the attribute name, the attribute value, the element value and the tag name of the end tag with respect to the third block and generate the lower index.

Figure 6:
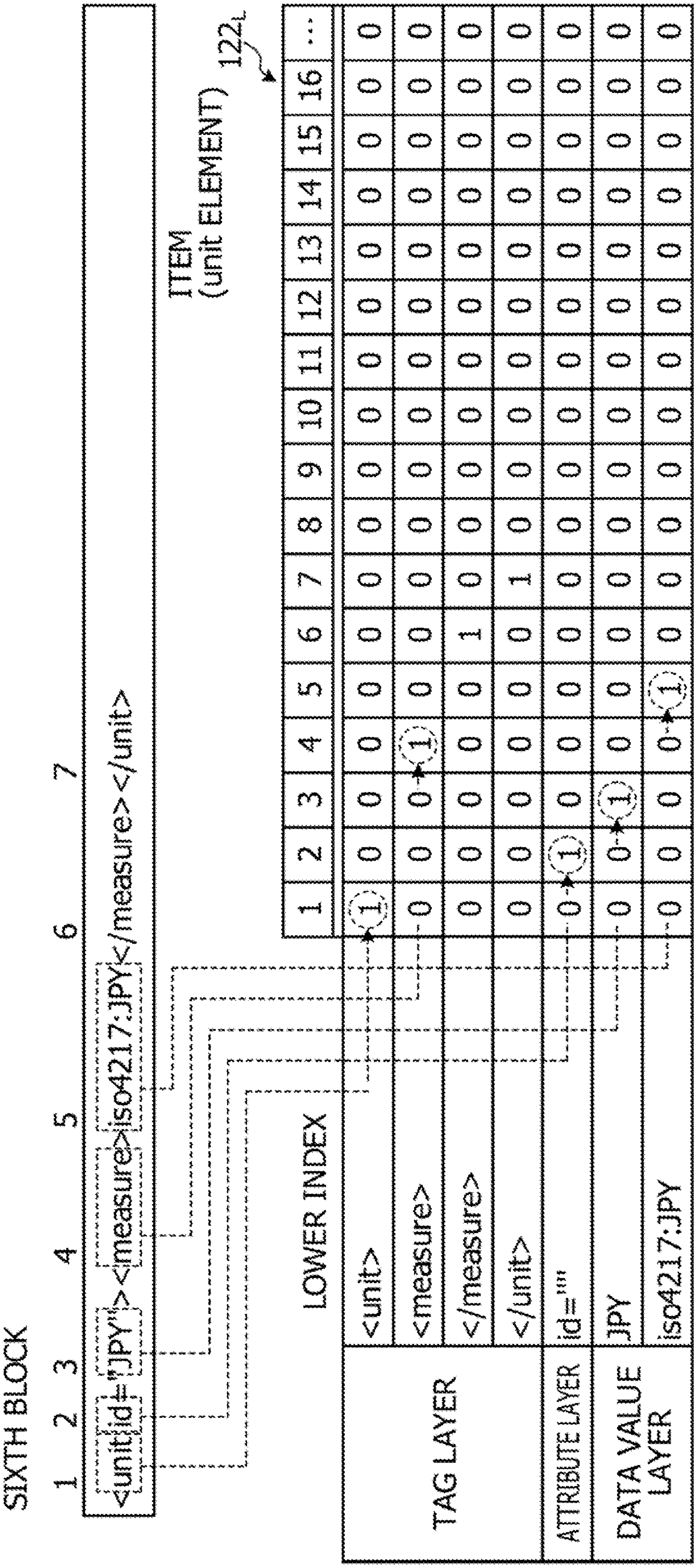
FIG. 6 is a diagram illustrating an example of a flow of index generation processing of another lower index according to the first embodiment.

FIG. 6 is a diagram illustrating an example of a flow of index generation processing of another lower index according to the first embodiment. Here, processing for generating a lower index in a sixth block in the XBRL data will be described. In the sixth block, a lower index of a unit element is generated.

As illustrated in FIG. 6, in a case where the index generation unit 113 detects the start tag in the sixth block, a tag name "<unit>" of the start tag is registered to the tag layer. The tag name means an element name. Then, the index generation unit 113 writes "1" in a bit corresponding to an appearance position "1" in an index (bitmap) corresponding to the tag name "<unit>" of the start tag. It is preferable that a method for detecting the tag name by the index generation unit 113 be the same as the method described in FIG. 58.

In a case where "id=" is detected as an attribute name, the index generation unit 113 registers the attribute name "id=" to the attribute layer. Then, the index generation unit 113 writes "1" in a bit corresponding to an appearance position "2" in an index (bitmap) corresponding to the attribute name "id=". It is preferable that a method for detecting the attribute name by the index generation unit 113 be the same as the method described in FIG. 5B.

When detecting "JPY" as the attribute value, the index generation unit 113 registers the attribute value "JPY" to the data value layer. Then, the index generation unit 113 writes "1" in a bit corresponding to an appearance position "3" in an index (bitmap) corresponding to the attribute value "JPY". It is preferable that a method for detecting the attribute value by the index generation unit 113 be the same as the method described in FIG. 5B.

When detecting the start tag, the index generation unit 113 registers a tag name "<measure>" of a tag to the tag layer. The tag name means an element name. Then, the index generation unit 113 writes "1" in a bit corresponding to an appearance position "4" in an index (bitmap) corresponding to the tag name "<measure>" of the start tag.

When detecting "iso4217:JPY" as the element value, the index generation unit 113 registers the element value "iso4217:JPY" to the data value layer. Then, the index generation unit 113 writes "1" in a bit corresponding to an appearance position "5" in an index (bitmap) corresponding to the element value "iso4217:JPY". It is preferable that a method for detecting the element value by the index generation unit 113 be the same as the method described in FIG. 5B.

In this way, it is preferable that the index generation unit 113 sequentially detect the tag name of the start tag, the attribute name, the attribute value, the element value, and the tag name of the end tag with respect to the sixth block and generate the lower index.

Figure 7:
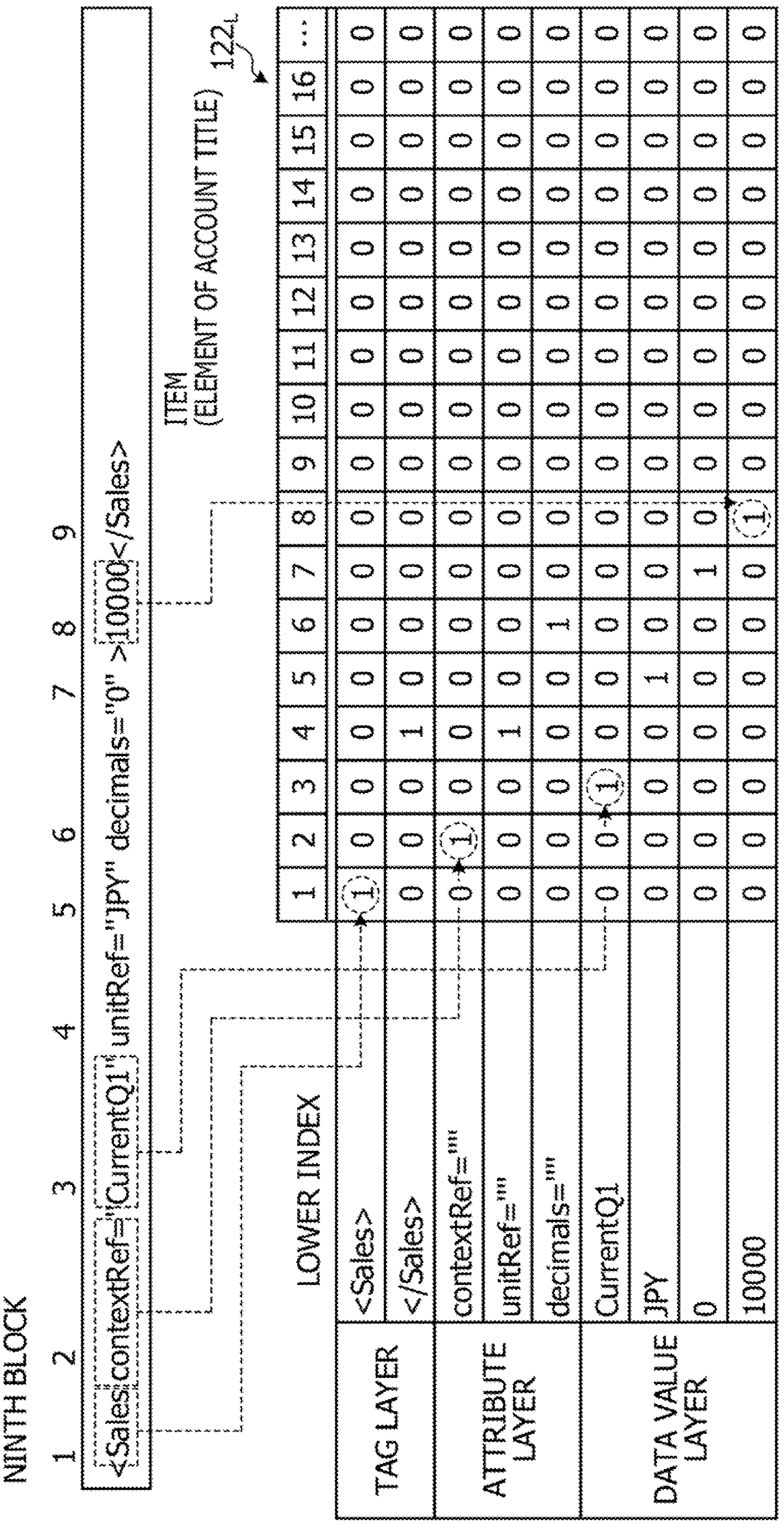
FIG. 7 is a diagram illustrating an example of a flow of index generation processing of still another lower index according to the first embodiment.

FIG. 7 is a diagram illustrating an example of a flow of index generation processing of still another lower index according to the first embodiment. Here, processing for generating a lower index in a ninth block in the XBRL data will be described. In the ninth block, a lower index of an account title element is generated.

As illustrated in FIG. 7, in a case where the index generation unit 113 detects the start tag in the ninth block, a tag name "<Sales>" of the start tag is registered to the tag layer. The tag name means an element name. Then, the index generation unit 113 writes "1" in a bit corresponding to an appearance position "1" in an index (bitmap) corresponding to the tag name "<Sales>".

When detecting "contextRef=" as the attribute name, the index generation unit 113 registers the attribute name "contextRef=" to the attribute layer. Then, the index generation unit 113 writes "1" in a bit corresponding to an appearance position "2" in an index (bitmap) corresponding to the attribute name "contextRef=".

When detecting "CurrentQ1" as the attribute value, the index generation unit 113 registers the attribute value "CurrentQ1" to the data value layer. Then, the index generation unit 113 writes "1" in a bit corresponding to an appearance position "3" in an index (bitmap) corresponding to the attribute value "CurrentQ1".

When detecting "10000" as the element value, the index generation unit 113 registers the element value "10000" to the data value layer. Then, the index generation unit 113 writes "1" in a bit corresponding to an appearance position "8" in an index (bitmap) corresponding to the element value "10000".

In this way, it is preferable that the index generation unit 113 sequentially detect the tag name of the start tag, the attribute name, the attribute value, the element value, and the tag name of the end tag with respect to the ninth block and generate the lower index.

[How to Allocate Offset]

FIG. 8 is a diagram for explaining how to allocate offsets of the lower index. The upper diagram in FIG. 8 illustrates a case where the offsets of the lower index are allocated to a head position of the start tag, a head position of the element value, and a head position of the end tag. The head position of the start tag is a position of "S" in "<Sales . . . >". The head position of the element value is a position of "1" in "10000". The head position of the end tag is a position of "S" in "</Sales>". Then, at the head position of the start tag, the head position of the element value, and the head position of the end tag, "1", "2", and "3" are respectively allocated as the offsets.

As illustrated in the upper diagram in FIG. 8, whether the attribute name is included in the start tag can be specified from the lower index. However, the attribute value corresponding to the attribute name cannot be specified. Here, it can be specified that "contextRef=", "unitRef=", and "decimals=" as the attribute names are in the offset "1", However, it cannot be specified whether the attribute value corresponding to the attribute name "contextRef=" is any one of "CurrentQ1", "JPY", "0", and "10000". Similarly, it cannot be specified whether the attribute value corresponding to the attribute name "unitRef=" is any one of "CurrentQ1", "JPY", "0", and "10000". It cannot be specified whether the attribute value corresponding to the attribute name "decimals=" is any one of "CurrentQ1", "JPY", "0", and "10000".

On the other hand, the lower diagram in FIG. 8 illustrates a case where the offsets of the lower index are allocated to the head position of the start tag, the head position of the attribute name, the head position of the attribute value, the head position of the element value, and the head position of the end tag. The head position of the start tag is a position of "S" in "<Sales". The head positions of the attribute values are a position of "c" in "contextRef=", a position of "u" in "unitRef=", and a position of "d" in "decimals=". The head positions of the attribute values are a position of "C" in "CurrentQ1", a position of "3" in "JPY", and a position of "0" in "0", and the head position of the element value is a position of "1" in "10000". The head position of the end tag is a position of "S" in "</Sales>", Then, the offsets are each allocated to the head position of the start tag, the head position of the attribute name, the head position of the attribute value, the head position of the element value, and the head position of the end tag.

As illustrated in the lower diagram in FIG. 8, not only whether the attribute name is included in the start tag but also the attribute value corresponding to the attribute name can be specified from the lower index. That is, it is found that a data value located at the offset on the right side of the offset where the attribute name is located indicates the attribute value corresponding to the attribute name. Here, an attribute value corresponding to the attribute name "contextRef=" is "CurrentQ1". It is found that an attribute value corresponding to the attribute name "unitRef=" is "JPY". It is found that an attribute value corresponding to the attribute name "decimals=" is "O". Furthermore, a data value located at the offset on the left side of the offset where the end tag is located indicates the element value corresponding to the element name. Here, an element value corresponding to the element name "Sales" is "10000".

In this way, as illustrated in the lower diagram in FIG. 8, it is preferable that the offsets of the lower index be allocated to the start tag, the attribute name, the attribute value, the element value, and the end tag.

[Flowchart of Index Generation Processing]

Figure 9A:
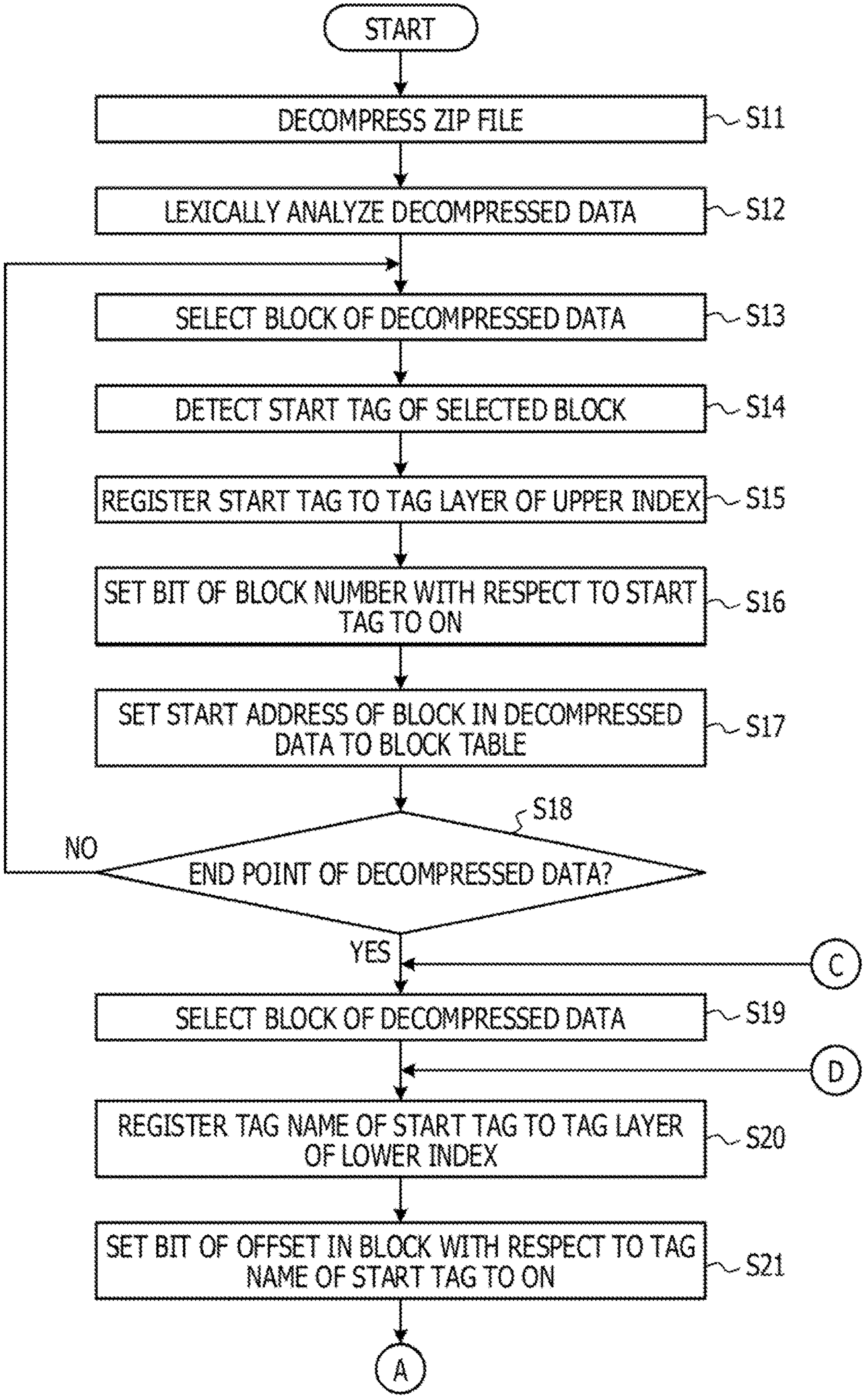
FIGS. 9A to 9C are a diagram illustrating an example of a flowchart of the index generation processing according to the first embodiment.
Figure 9B:
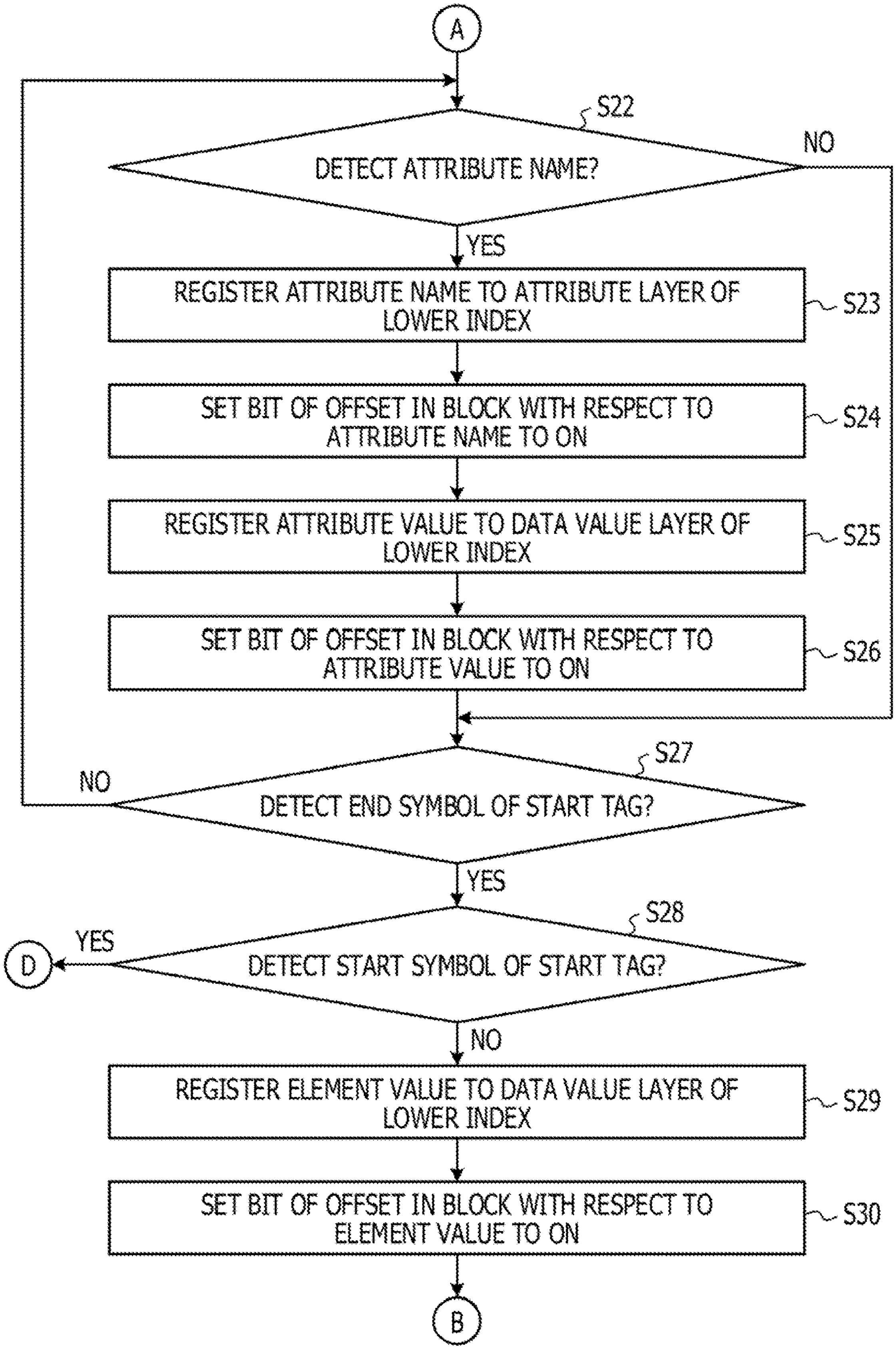
Figure 9C:
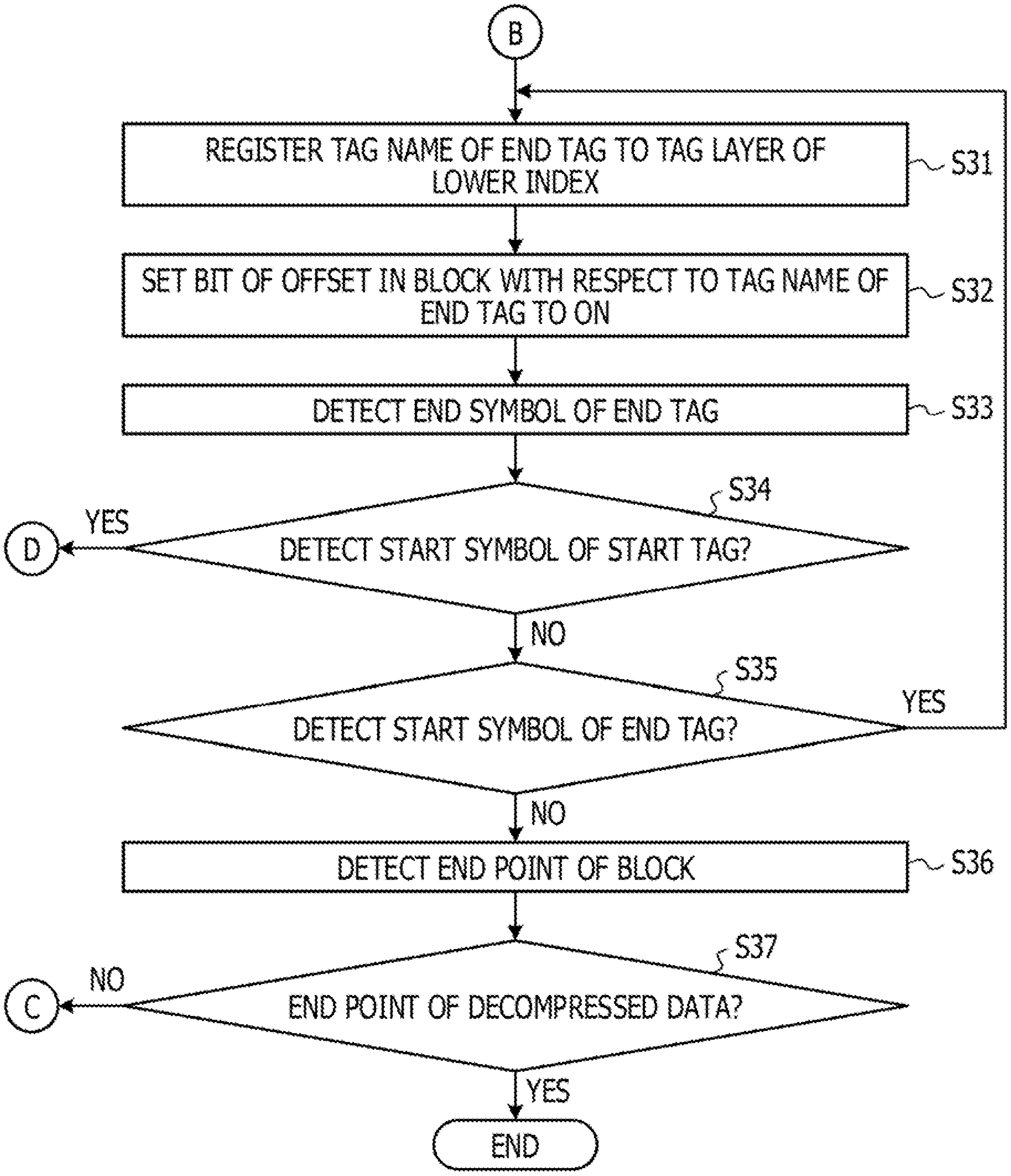

FIGS. 9A to 9C are a diagram illustrating an example of a flowchart of the index generation processing according to the first embodiment. The compressed XBRL data will be described as a Zip file.

The decompression unit 111 which has received a Zip file decompresses the Zip file (step S11). The lexical analysis unit 112 lexically analyzes the decompressed data (step S12).

Subsequently, the index generation unit 113 selects a block of the decompressed data (step S13). The index generation unit 113 detects a start tag of the selected block (step S14). Then, the index generation unit 113 registers a tag name of the detected start tag to the tag layer in the index information $\mathbf{122}_U$ of the upper index (step S15). The index generation unit 113 sets a bit of a block number of the selected block with respect to the detected start tag to ON in the index information $\mathbf{122}_U$ of the upper index (step S16).

Then, the index generation unit 113 sets a start address of the block in the decompressed data to the block table 121 (step S17).

Then, the index generation unit 113 determines whether the block is an end point of the decompressed data (step S18). In a case where it is determined that the block is not the end point of the decompressed data (No in step S18), the index generation unit 113 proceeds to step S13 so as to select a next block.

On the other hand, in a case where it is determined that the block is the end point of the decompressed data (Yes in step S18), the index generation unit 113 selects the block of the decompressed data (step S19).

Then, the index generation unit 113 registers the tag name of the start tag to the tag layer of the index information $\mathbf{122}_L$ of the lower index with respect to the selected block (step S20). The index generation unit 113 sets a bit of the offset in the block with respect to the tag name of the start tag to ON in the index information $\mathbf{122}_L$ of the lower index with respect to the selected block (step S21).

Then, the index generation unit 113 determines whether or not the attribute name is detected in the selected block (step S22). In a case where it is determined that the attribute name is detected (Yes in step S22), the index generation unit 113 registers the detected attribute name to the attribute layer of the index information $\mathbf{122}_L$ Of the lower index with respect to the selected block (step S23). Then, the index generation unit 113 sets a bit of the offset in the block with respect to the detected attribute name to ON in the index information $\mathbf{122}_L$ of the lower index with respect to the selected block (step S24).

Then, the index generation unit 113 registers the attribute value to the data value layer of the index information $\mathbf{122}_L$ of the lower index with respect to the selected block (step S25). Then, the index generation unit 113 sets a bit of the offset in the block with respect to the attribute value to ON in the index information $\mathbf{122}_L$ of the lower index with respect to the selected block (step S26). Then, the index generation unit 113 proceeds the procedure to step S27.

On the other hand, in a case where it is determined that the attribute name is not detected (No in step S22), the index generation unit 113 determines whether or not the end symbol of the start tag is detected (step S27). In a case where it is determined that the end symbol of the start tag is not detected (No in step S27), the index generation unit 113 proceeds to step S22 so as to detect a next attribute name.

On the other hand, in a case where it is determined that the end symbol of the start tag is detected (Yes in step S27), the index generation unit 113 determines whether or not the start symbol of the start tag is detected (step S28). In a case where it is determined that the start symbol of the start tag is detected (Yes in step S28), the index generation unit 113 proceeds the procedure to step S20.

On the other hand, in a case where it is determined that the start symbol of the start tag is not detected (No in step S28), the index generation unit 113 registers the element value to the data value layer of the index information 122$_L$ of the lower index with respect to the selected block (step S29). Then, the index generation unit 113 sets a bit of the offset in the block with respect to the element value to ON in the index information 122$_L$ of the lower index with respect to the selected block (step S30).

Then, the index generation unit 113 registers the tag name of the end tag to the tag layer of the index information 122$_L$ of the lower index with respect to the selected block (step S31). The index generation unit 113 sets a bit of the offset in the block with respect to the tag name of the end tag to ON in the index information 122$_L$ of the lower index with respect to the selected block (step S32). Then, the index generation unit 113 detects the end symbol of the end tag (step S33).

Then, the index generation unit 113 determines whether or not the start symbol of the start tag is detected (step S34). In a case where it is determined that the start symbol of the start tag is detected (Yes in step S34), the index generation unit 113 proceeds the procedure to step S20.

On the other hand, in a case where it is determined that the start symbol of the start tag is not detected (No in step S34), the index generation unit 113 determines whether or not the start symbol of the end tag is detected (step S35). In a case where it is determined that the start symbol of the end tag is detected (Yes in step S35), the index generation unit 113 proceeds the procedure to step S31.

On the other hand, in a case where it is determined that the start symbol of the end tag is not detected (No in step S35), the index generation unit 113 detects an end point of the block (step S36), Then, the index generation unit 113 determines whether the block is an end point of the decompressed data (step S37). In a case where it is determined that the block is not the end point of the decompressed data (No in step S37), the index generation unit 113 proceeds the procedure to step S19 so as to select a next block.

On the other hand, in a case where it is determined that the block is the end point of the decompressed data (Yes in step S37), the index generation unit 113 terminates the index generation processing.

[Configuration of Search Device According to First Embodiment]

Figure 10:
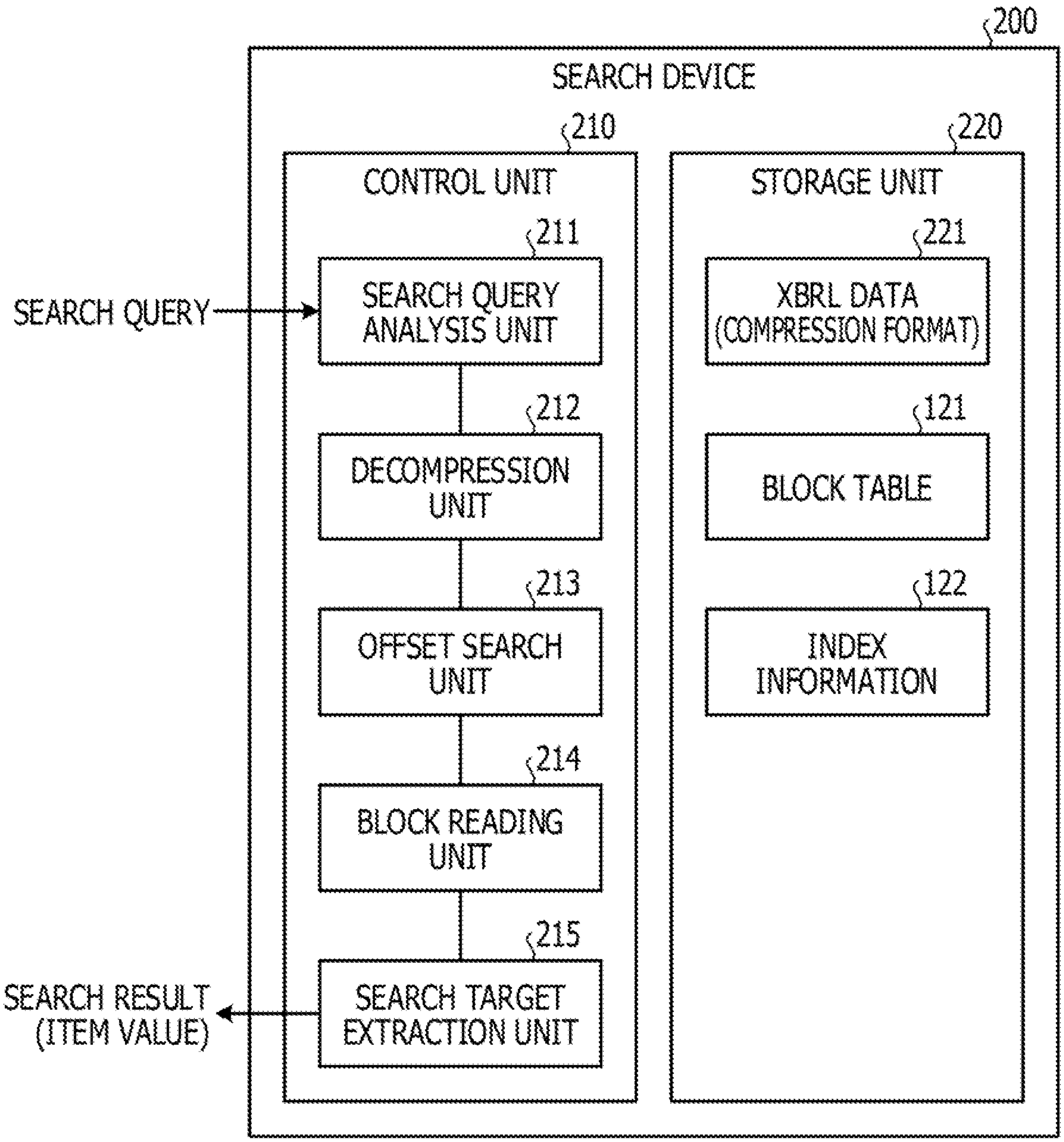
FIG. 10 is a functional block diagram illustrating a configuration of a search device according to the first embodiment.

FIG. 10 is a functional block diagram illustrating a configuration of a search device according to the first embodiment. A search device 200 receives a search condition including a specific item and value relative to the XBRL data described by a combination of the item and value, refers to the index information 122, and searches for the received search condition.

As illustrated in FIG. 10, the search device 200 includes a control unit 210 and a storage unit 220.

The storage unit 220 corresponds to a storage device such as a non-volatile semiconductor memory element, for example, a Flash Memory, a Ferroelectric Random Access Memory (FRAM) (registered trademark), and the like. The storage unit 220 includes XBRL data (compression format) 221, the block table 121, and the index information 122. The block table 121 and the index information 122 are information generated by the index generation device 100 and, for example, are acquired via a network and stored in the storage unit 220.

The XBRL data (compression format) 221 is XBRL data in a compression format. For example, the XBRL data (compression format) 221 is XBRL data compressed in the Zip format.

The control unit 210 includes an internal memory for storing a program and control data for specifying various processing procedures and executes various processing by using the stored data. Then, the control unit 210 corresponds to an electronic circuit of an integrated circuit, for example, an Application Specific Integrated Circuit (ASIC), a Field Programmable Gate Array (FPGA), and the like. Alternatively, the control unit 210 corresponds to an electronic circuit such as a Central Processing Unit (CPU) and a Micro Processing Unit (MPU). The control unit 210 includes a search query analysis unit 211, a decompression unit 212, an offset search unit 213, a block reading unit 214, and a search target extraction unit 215. The search query analysis unit 211 is an example of a reception unit. The offset search unit 213, the block reading unit 214, and the search target extraction unit 215 are examples of a search unit.

The search query analysis unit 211 input a search query and analyzes the input search query. For example, the search query analysis unit 211 analyzes the search query and extracts a search condition and a search target. The search condition includes a keyword indicating the element name, the tag name, the attribute name, the attribute value, or the element value. The search target includes a keyword indicating the attribute name or the element name of which a value is desired to be searched.

The decompression unit 212 receives the XBRL data (compression format) 221 and decompresses the received XBRL data (compression format) 221. The compressed XBRL data (compression format) 221 here is, for example, data obtained by compressing the XBRL data submitted by a company in the Zip format.

The offset search unit 213 refers to the index information 122 and searches for a search target that matches the search condition. For example, the offset search unit 213 refers to the index information 122$_U$ of the upper index and extracts an index (bitmap) corresponding to the element name of the search condition. The offset search unit 213 acquires a block number in which "1" is set to the extracted bitmap. The offset search unit 213 extracts the index information 122$_L$ of the lower index corresponding to the detected block number. The offset search unit 213 refers to the extracted index information 122 of the lower index and narrows an offset of the search target which matches the search condition.

The block reading unit 214 reads a block corresponding to the acquired block number from the decompressed XBRL data. For example, the block reading unit 214 acquires the address 121*b* in the XBRL data corresponding to the acquired block number from the block table 121. The block reading unit 214 reads the block associated with the acquired address from the XBRL data decompressed by the decompression unit 212.

The search target extraction unit 215 extracts the search target from a target block. For example, the search target extraction unit 215 extracts the search target of the offset narrowed by the offset search unit 213 from the block read by the block reading unit 214.

[Flow of Offset Search Processing]

Figure 12:
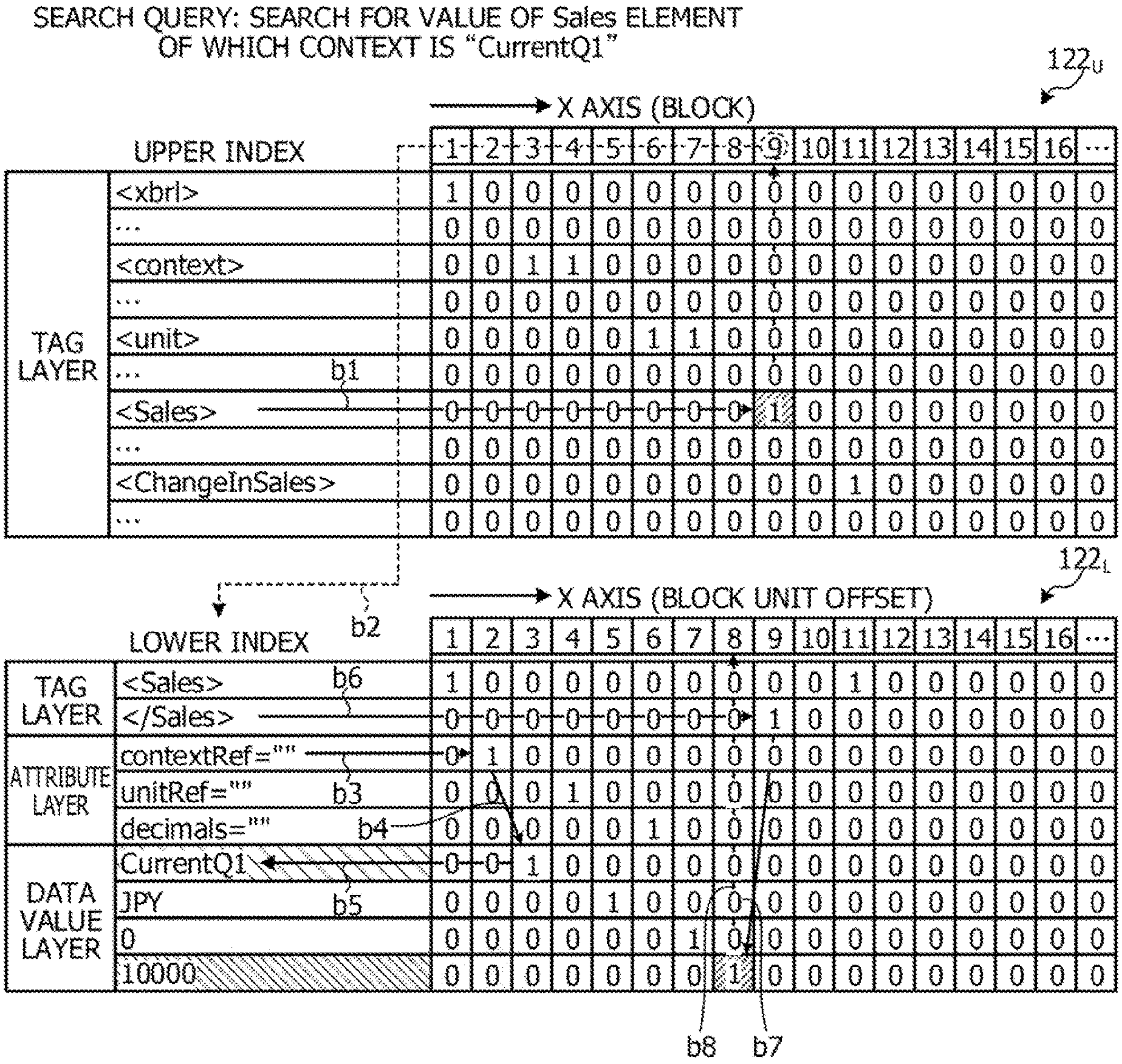
FIG. 12 is a diagram illustrating an example of the flow of the offset search processing according to the first embodiment.

Here, an example of a flow of offset search processing according to the first embodiment will be described with reference to FIGS. 11 and 12. FIGS. 11 and 12 are diagrams illustrating an example of the flow of the offset search processing according to the first embodiment.

FIG. 11 illustrates a case where a search query searches for an id attribute value of a context element of which the date is "2016". The search query analysis unit 211 analyzes the search query and extracts a search condition and a search target. Here, as the search conditions, "<context>" which is a context element, "<instant>" which is an instant element indicating the date, and "2016" which is an element value of the instant element indicating the date are extracted. As the search target, "id=" which is the id attribute name of which a value is desired to be searched is extracted.

Then, the offset search unit 213 refers to the index information $\mathbf{122}_U$ of the upper index, extracts an index (bitmap) corresponding to the element name of the search condition, and acquires a block number in which "1" is set to the extracted bitmap. Here, the element name of the search condition is "<context>". Then, the offset search unit 213 refers to the index information $\mathbf{122}_U$ of the upper index and extracts a bitmap corresponding to "<context>", Then, the offset search unit 213 acquires "3" as the block number in which "1" is set to the extracted bitmap (a1).

Then, the offset search unit 213 extracts the index information $\mathbf{122}_L$ of the lower index corresponding to the detected block number "3" (a2).

Then, the offset search unit 213 refers to the extracted index information $\mathbf{122}_L$ of the lower index and narrows an offset of the search target that matches the search condition.

Here, the offset search unit 213 acquires an offset at an end position of "<instant>" which is the instant element indicating the date. That is, the offset search unit 213 extracts a bitmap corresponding to an end tag "</instant>" of the instant element and acquires an offset "14" in which "1" is set to the extracted bitmap (a3).

Then, the offset search unit 213 acquires a data value in which "1" is set to an offset "13" immediately before the offset of the end tag of the instant element so as to search for a value of the instant element (a4 and a5). The acquired data value is "2016-06-30". Then, the offset search unit 213 confirms that the acquired data value "2016-06-30" is the element value "2016" of the instant element indicating the data included in the search condition.

Subsequently, the offset search unit 213 acquires an offset at a start position of "id=" which: is the id attribute name extracted as the search target. That is, the offset search unit 213 extracts a bitmap corresponding to "id=" and acquires an offset "2" in which "1" is set to the extracted bitmap (a6).

Then, the offset search unit 213 searches for an offset "3" immediately after the offset of the id attribute so as to search for the offset of the value of the id attribute (a7 and a8). Thus, the offset search unit 213 can search for "3" as the offset of the id attribute value of the context element of which the date is "2016".

FIG. 12 illustrates a case where the search query searches for a value of the Sales element of which the context is "CurrentQ1". The search query analysis unit 211 analyzes the search query and extracts a search condition and a search target. Here, as the search conditions, "<Sales>" which is the Sales element, "contextRef=" which is the attribute of the context, and "CurrentQ1" which is the attribute value of the context are extracted. As the search target, "<Sales>" which is the Sales element name of which a value is desired to be searched is extracted.

Then, the offset search unit 213 refers to the index information $\mathbf{122}_U$ of the upper index, extracts an index (bitmap) corresponding to the element name of the search condition, and acquires a block number in which "I" is set to the extracted bitmap. Here, the element name of the search condition is "<Sales>". Then, the offset search unit 213 refers to the index information $\mathbf{122}_U$ of the upper index, extracts a bitmap corresponding to "<Sales>", and acquires "9" as a block number in which "1" is set to the extracted bitmap (b1).

Then, the offset search unit 213 extracts the index information $\mathbf{122}_L$ of the lower index corresponding to the detected block number "9" (b2).

Then, the offset search unit 213 refers to the extracted index information $\mathbf{122}_L$ of the lower index and narrows an offset of the search target that matches the search condition.

Here, the offset search unit 213 acquires an offset of "contextRef=" which is the attribute of the context. That is, the offset search unit 213 extracts a bitmap corresponding to "contextRef" and acquires an offset "2" in which "1" is set to the extracted bitmap (b3).

Then, the offset search unit 213 acquires a data value in which "1" is set to an offset "3" immediately after the offset of the contextRef attribute so as to search for a value of the contextRef attribute (b4 and b5). The acquired data value is "CurrentQ1". Then, the offset search unit 213 confirms that the acquired data value "CurrentQ1" is the attribute value "CurrentQ1" of the context included in the search condition.

Subsequently, the offset search unit 213 acquires an offset at an end position of "<Sales>" which is the Sales element extracted as the search target. That is, the offset search unit 213 extracts a bitmap corresponding to an end tag "</Sales>" of the Sales element and acquires an offset "9" in which "1" is set to the extracted bitmap (b6).

Then, the offset search unit 213 searches for an offset "8" immediately before the offset of the end tag of the Sales element so as to search for the value of the Sales element (b7 and b8). In this way, the offset search unit 213 can search for "8" as the offset of the value of the Sales element of which the context is "CurrentQ1".

[Flow of Search Target Extraction Processing]

Figure 13:
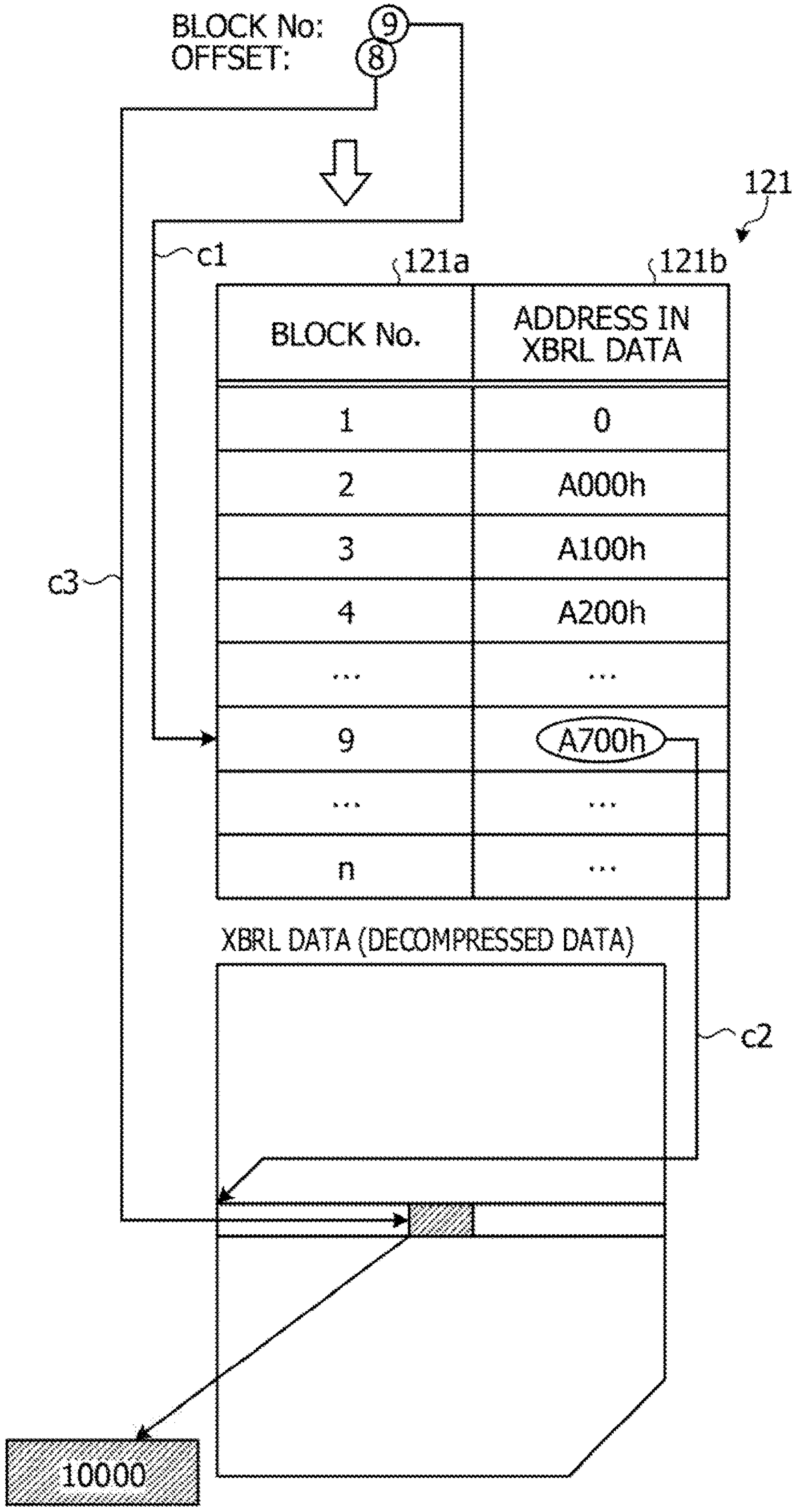
FIG. 13 is a diagram illustrating an example of a flow of search target extraction processing according to the first embodiment.

Here, an example of a flow of search target extraction processing according to the first embodiment will be described with reference to FIG. 13. FIG. 13 is a diagram illustrating an example of the flow of the search target extraction processing according to the first embodiment. A case will be described where the offset search unit 213 acquires "9" as a block number and searches for "8" as an offset.

The block reading unit 214 acquires the address 121*b* in the XBRL data corresponding to the acquired block number from the block table 121 (c1), Here, "A700h" is acquired as the address 121*b* in the XBRL data corresponding to the acquired block number "9".

Then, the block reading unit 214 reads a block associated with the acquired address "A700h" from the XBRL data decompressed by the decompression unit 212 (c2).

Subsequently, the search target extraction unit 215 extracts a search target at a position of the searched offset from the block read by the block reading unit 214 (c3). Here, the search target extraction unit 215 extracts "10000" as a search target at the position of "8" searched as the offset from the read block. Then, the search target extraction unit 215 outputs the extracted "10000" as a search result.

[Flowchart of Search Processing]

Figure 14:
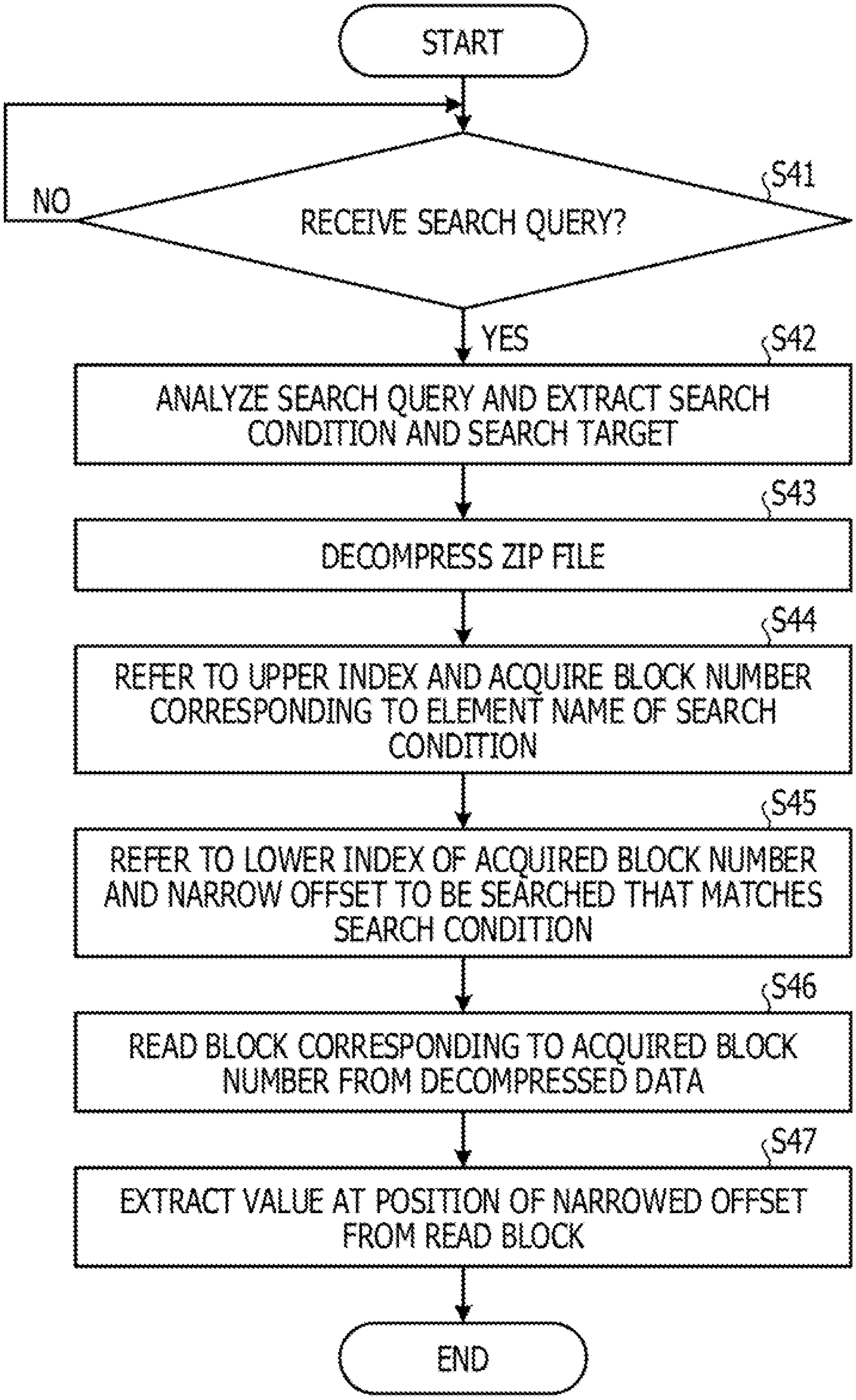
FIG. 14 is a diagram illustrating an example of a flowchart of search processing according to the first embodiment.

FIG. 14 is a diagram illustrating an example of a flowchart of search processing according to the first embodiment. The compressed XBRL data will be described as a Zip file.

The search query analysis unit 211 determines whether or not a search query is received (step S41). In a case where it is determined that the search query is not received (No in step S41), the search query analysis unit 211 repeats determination processing until the search query is received.

On the other hand, in a case where it is determined that the search query is received (Yes in step S41), the search query analysis unit 211 analyzes the search query and extracts a search condition and a search target (step S42).

Then, the decompression unit 212 decompresses the Zip file (step S43).

Subsequently, the offset search unit 213 refers to the index information $122_U$ of the upper index and acquires a block number corresponding to the element name of the search condition (step S44). Then, the offset search unit 213 refers to the index information $122_L$ of the lower index of the acquired block number and narrows an offset of the search target that matches the search condition (step S45).

Subsequently, the block reading unit 214 reads a block corresponding to the acquired block number from the decompressed data (step S46). Then, the search target extraction unit 215 extracts a value at the position of the narrowed offset from the read block (step S47). Then, the search target extraction unit 215 outputs the extracted value as a search result and terminates the search processing.

[Example of Search Flow According to First Embodiment]

Figure 15:
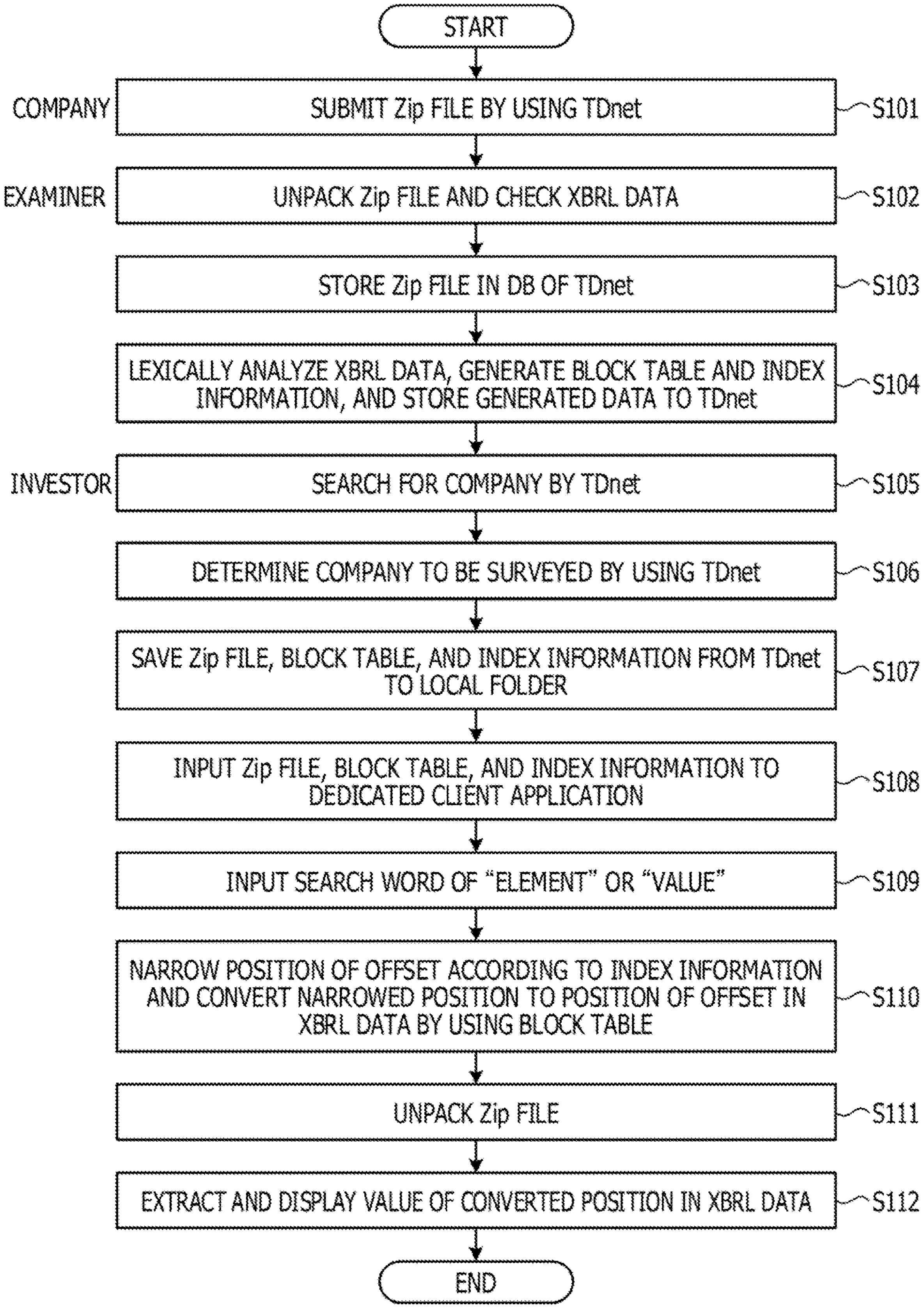
FIG. 15 is a diagram illustrating an example of a search flow according to the first embodiment.

FIG. 15 is a diagram illustrating an example of a search flow according to the first embodiment. In addition, in FIG. 15, a case will be described where the TDnet is used so as to compare the search flow with the search flow in the reference example illustrated in FIG. 26. However, the search flow is not limited to the search flow using the TDnet.

As illustrated in FIG. 15, a company submits a Zip file obtained by compressing XBRL data of financial information by Zip by using the TDnet (S101).

On the side of the examiner, the examiner unpacks (decompress) the Zip file and checks the decompressed XBRL data (S102). The examiner stores the Zip file of the approved XBRL data in a DB of the TDnet (S103) and discloses the XBRL data. The examiner here is, for example, a financial institution or a stock exchange.

Then, the index generation device 100 lexically analyzes the XBRL data, generates the block table 121 and the index information 122, and stores the generated data to an internal memory of the TDnet (S104). Such processing corresponds to, for example, the lexical analysis unit 112 and the index generation unit 113.

On the side of the client (investor), the investor searches for a company by using the TDnet (S105) and determines a company to be surveyed (S106). The investor saves a Zip file for the XBRL data of the determined company, the block table 121, and the index information 122 to a local folder by using the TDnet (S107).

Subsequently, the investor inputs the Zip file, the block table 121, and the index information 122 to a dedicated client application of the search device 200 (S108).

In addition, the investor inputs a search word of an element to be searched and a search word of a value to be searched to the dedicated client application of the search device 200 (S109). That is, the investor inputs a search query to the search device 200. Then, the dedicated client application analyzes the search query and extracts a search condition and a search target. Such processing corresponds to, for example, the search query analysis unit 211.

Then, the dedicated client application narrows a position of an offset of the search target that matches the search condition according to the index information 122 and converts the position of the offset narrowed by using the block table 121 to a position of an offset in the XBRL data (S110). Then, the investor unpacks (decompress) the saved Zip file (S111), Then, the dedicated client application extracts and displays a value of the converted position of the offset in the decompressed XBRL data (S112). Such processing corresponds to, for example, the offset search unit 213, the decompression unit 212, and the search target extraction unit 215.

[Effect of First Embodiment]

In this way, in the first embodiment, the index generation device 100 inputs the XBRL data described by the combination of the item and value. The index generation device 100 generates the index information 122 regarding the appearance positions of each of the item and the value for each of the item and the value included in the XBRL data. According to the above configuration, by using the index information 122, the index generation device 100 can efficiently search for the search target in the XBRL data according to the search condition formed by combining the items and values. That is, by using the index information 122, the index generation device 100 can narrow the search target without scanning the XBRL data and efficiently search for the search target.

In the first embodiment, the search device 200 receives a search condition including a specific item and value relative to the XBRL data described by the combination of the item and the value. The search device 200 refers to the index information 122 regarding the appearance positions of each of the item and the value for each of the item and the value included in the XBRL data and searches for the search condition. With this configuration, by using the index information 122, the search device 200 can perform search as specifying the item and the value without analyzing the XBRL data again.

Second Embodiment

It has been described that the index generation device 100 according to the first embodiment generates the index information 122 regarding the appearance positions of each of the item and the value for each of the item and the value included in the XBRL data. However, the index generation device 100 is not limited to this, and when encoding the XBRL data, the index generation device 100 may generate index information 122 regarding appearance positions of each of an encoded item and an encoded value for each of the item and the value included in the XBRL data.

Therefore, a case will be described where the index generation device 100 according to the second embodiment generates index information 122A regarding appearance positions of each of the encoded item and the encoded value for each of the item and the value included: in the XBRL data when encoding the XBRL data.

[Configuration of Index Generation Device According to Second Embodiment]

Figure 16:
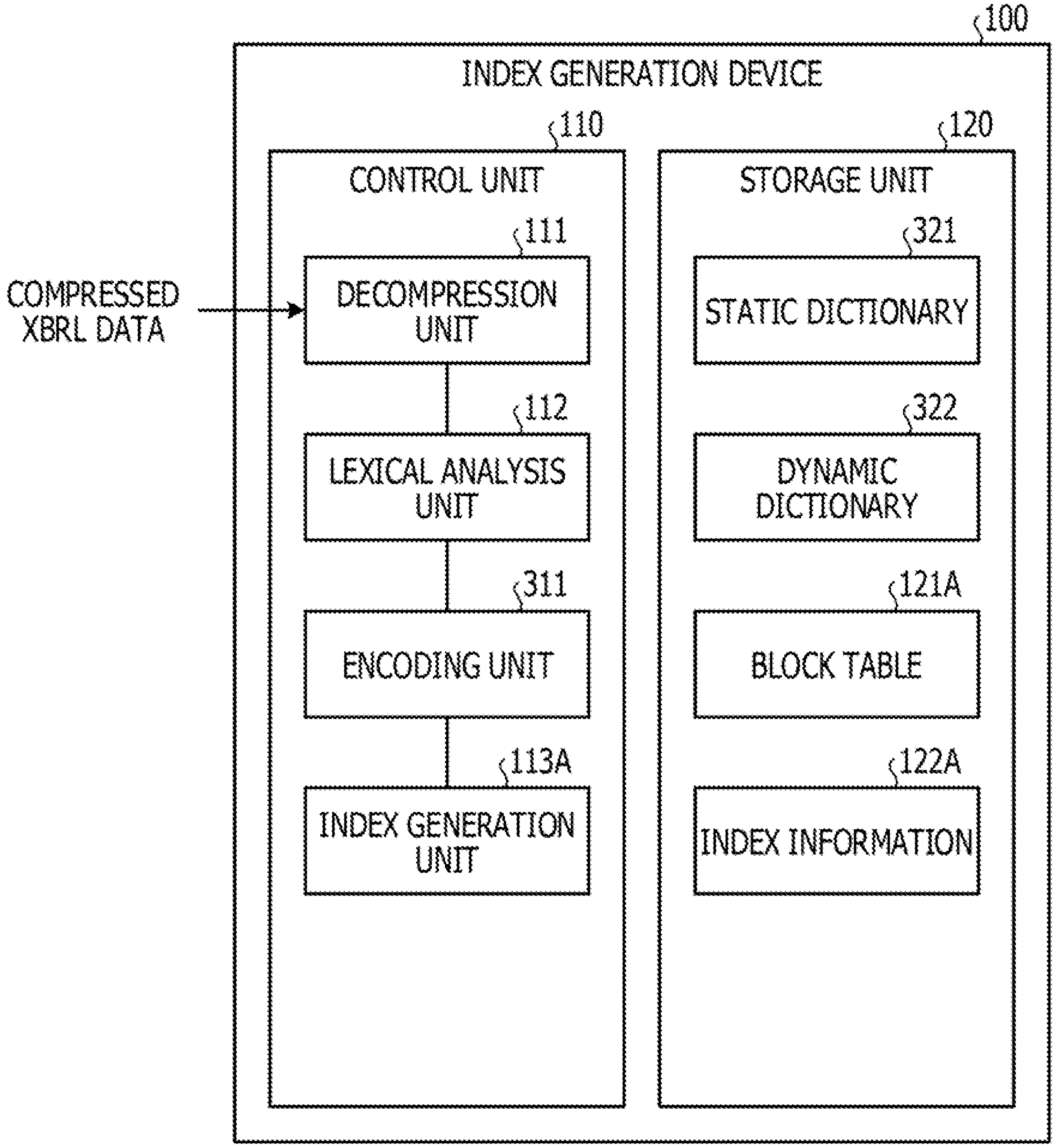
FIG. 16 is a block diagram illustrating a functional configuration of an index generation device according to a second embodiment.

FIG. 16 is a block diagram illustrating a functional configuration of an index generation device according to a second embodiment. A component having the same configuration as the index generation device 100 illustrated in FIG. 1 is denoted with the same reference numeral, and the description regarding the overlapped configurations and operations will be omitted, A difference between the first embodiment and the second embodiment is that the index generation unit 113 is changed to an index generation unit 113A. Furthermore, the difference between the first embodiment and the second embodiment is that an encoding unit 311 is added. In addition, the difference between the first embodiment and the second embodiment is that the block table 121 and the index information 122 are respectively changed to a block table 121A and index information 122A.

Moreover, the difference between the first embodiment and the second embodiment is that a static dictionary 321 and a dynamic dictionary 322 are added.

The static dictionary 321 specifies an appearance frequency of a word which appears in various documents based on general English dictionaries, Japanese dictionaries, textbooks, and the like and allocates a shorter reference to a word having a higher appearance frequency. In the static dictionary 321, a static code which is a code corresponding to each word is registered in advance. On the other hand, the dynamic dictionary 322 associates a word which is not registered in the static dictionary 321 with a dynamic code (code) which is dynamically added. The word which is not registered in the static dictionary 321 includes a word having a lower appearance frequency (low frequency word), a tag, a numerical value, a date, and the like, as an example. In the dynamic dictionary 322, a word associated with the dynamic code is registered to a buffer in an appearance order of words which are not registered to the static dictionary 321.

Here, an example of the dynamic dictionary 322 will be described with reference to FIG. 17. FIG. 17 is a diagram illustrating an example of a dynamic dictionary according to the second embodiment. The dynamic dictionary 322 illustrated in FIG. 17 includes a buffer D1 and an address table D2. The buffer D1 stores a character string. The address table D2 holds the dynamic code, a storage position, and a data length in association with each other. The dynamic code is a code having a predetermined fixed length and is, for example, a compression code. The dynamic code is allocated in an order in which the character strings of the words are registered. Here, the dynamic code is a two-byte code having a fixed length starting with a hexadecimal number "A" The storage position indicates a position of the character string stored in the buffer D1. The data length indicates a length (byte length) of the character string stored in the buffer D1.

As an example, a case will be described where a dynamic code is allocated to a character string "CurrentQ1" of an attribute value. The index generation device 100 stores the character string "CurrentQ1" to the buffer D1. The index generation device 100 registers the storage position where the character string is stored and the length of the stored data to the address table D2. Here, the index generation device 100 registers "21" as the storage position and "10" as the data length to the address table D2. Then, the index generation device 100 allocates "$A003_h$," to the character string "CurrentQ1" of the attribute value as the dynamic code.

The block table 121A stores each code for each data included in the XBRL data in association with an address and a block number in an encoded data obtained by encoding the XBRL data.

Here, an example of the block table 121A will be described with reference to FIG. 18. FIG. 18 is a diagram illustrating an example of a block table according to the second embodiment. As illustrated in FIG. 18, the block table 121A stores a block number 121*a* and an address 121*c* in the encoded data in association with each other. The block number 121*a* indicates a block number. The address 121*c* in the encoded data indicates a head address of a block included in the encoded data obtained by encoding the XBRL data. For example, in a case where the block number 121*a* is "1", "O" is stored as the address 121*c* in the encoded data. In a case where the block number 121*a* is "2", "201" is stored as the address 121*c* in the encoded data.

Referring to FIG. 16, the encoding unit 311 sequentially encodes a tag name, an attribute name, a data value obtained as a result of lexical analysis of the XBRL data as encoding targets based on the static dictionary 321 and the dynamic dictionary 322.

For example, the encoding unit 311 sequentially selects each encoding target as a result of lexical analysis of the XBRL data. The encoding unit 311 determines whether or not the selected encoding target is registered to the static dictionary 321. In a case where the selected encoding target is registered to the static dictionary 321, the encoding unit 311 encodes the encoding target to a static code (encoding code) registered in the static dictionary 321.

Furthermore, in a case where the selected encoding target is not registered in the static dictionary 321, the encoding unit 311 encodes the encoding target based on the dynamic dictionary 322. As an example, the encoding unit 311 determines whether or not the encoding target is stored in the buffer D1 of the dynamic dictionary 322. In a case where the encoding target is not stored in the buffer D1 of the dynamic dictionary 322, the encoding unit 311 stores the encoding target to the buffer D1 and stores the storage position where the encoding target is stored and the data length to the address table D2. The encoding unit 311 encodes the encoding target to a dynamic code (encoding code) of the address table D2 associated with the encoding target. Furthermore, in a case where the encoding target is stored in the buffer D1 of the dynamic dictionary 322, the encoding unit 311 encodes the encoding target to a dynamic code (encoding code) corresponding to the encoding target.

Furthermore, the encoding unit 311 writes the encoding code to a storage region of the encoded data.

The index generation unit 113A generates the index information 122A regarding appearance positions of each of the encoded item and the encoded value for each of the item and the value included in the XBRL data. For example, the index generation unit 113A sets a bit at an appearance position of an encoding code for a tag name in the block with respect to the tag name of the start tag at the head of each block in the XBRL data. That is, the index generation unit 113A generates index information 122$A_U$ of an upper index. Then, the index generation unit 113A sets a bit at the appearance position of the encoding code for the tag name in the block with respect to the tag names of the start tag and the end tag included in the block, for each block in the XBRL data. The index generation unit 113A sets a bit at an appearance position of an encoding code for the attribute name in the block with respect to the attribute name included in the block, for each block in the XBRL data. The index generation unit 113A sets a bit at an appearance position of an encoding code for each value for an element value and an attribute value included in the block, for each block in the XBRL data. That is, the index generation unit 113A generates index information 122$A_L$ Of a lower index. Then, the index generation unit 113A stores a block number and an address in the encoded data in association with each other in the block table 121A for each block. An encoding code for a tag name of a tag layer, an encoding code for an attribute name of an attribute layer, and an encoding code for a data value of a data value layer in the index information 122$A_L$ of the lower index may be registered in advance. Alternatively, when the index generation unit 113A generates indexes each of the tag name, the attribute name, and the data value to be encoded, the indexes may be registered to regions of each of the tag layer, the attribute layer, and the data value layer in the index information 122$A_L$. Hereinafter, a case where the tag name of the tag layer and the like is registered when the index generation unit 113A generates the index information 122A will be described.

[Flow of Index Generation Processing]

Here, examples of flows of the index generation processing according to the second embodiment will be described with reference to FIGS. 19A and 19B.

Figure 19A:
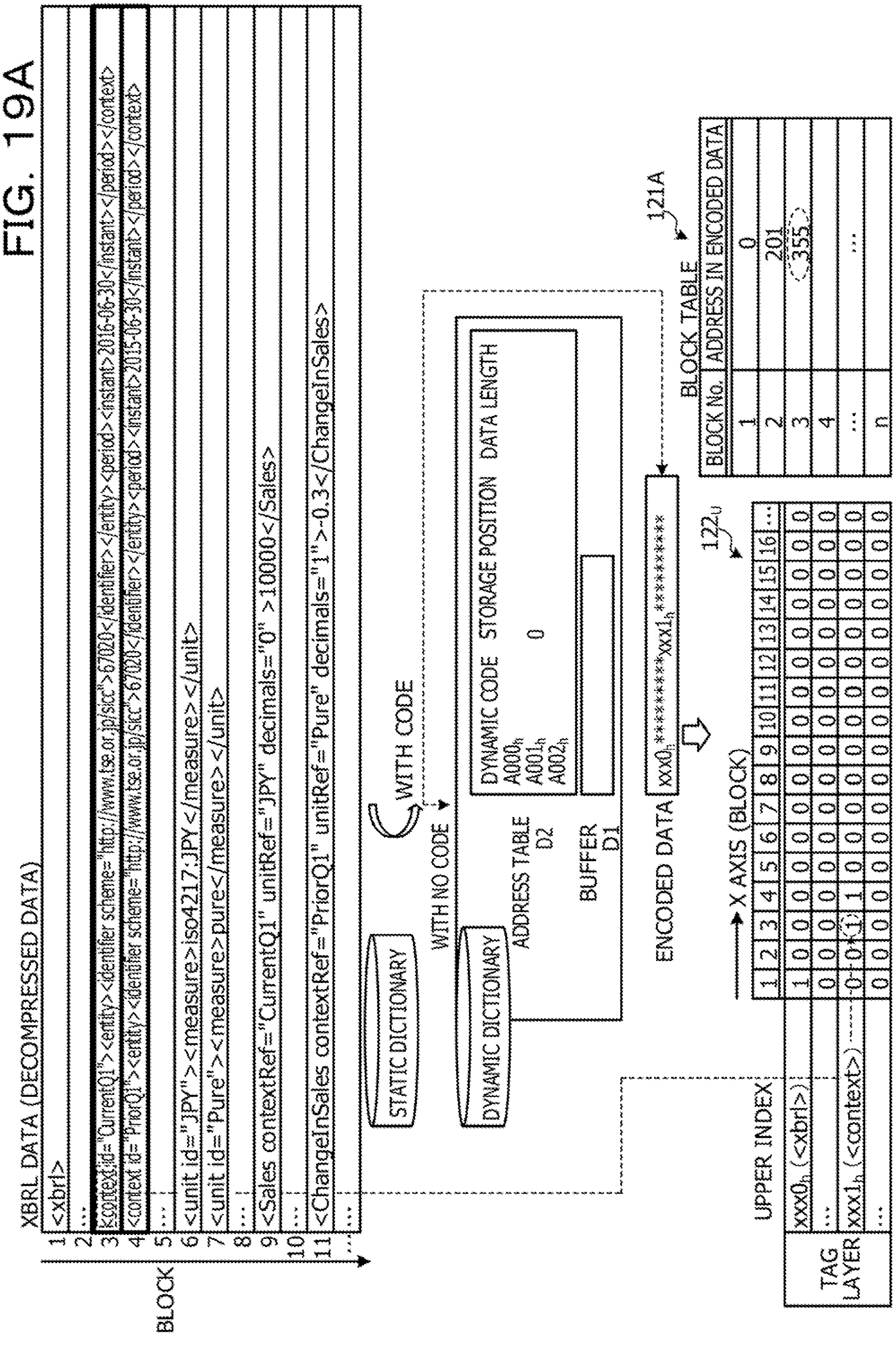
FIG. 19A is a diagram illustrating an example of a flow of index generation processing of an upper index according to the second embodiment.

FIG. 19A is a diagram illustrating an example of a flow of index generation processing of the upper index according to the second embodiment. As illustrated in FIG. 19A, the index generation unit 113A selects a block of the XBRL data. Here, it is assumed that the index generation unit 113A select a third block of the XBRL data.

Then, the index generation unit 113A makes the encoding unit 311 encode a tag name of a start tag of the selected block. For example, in a case where the tag name is registered in the static dictionary 321 (with code), the encoding unit 311 encodes the tag name to a registered static code. In a case where the tag name is not registered in the static dictionary 321 (no code), the encoding unit 311 encodes the tag name based on the dynamic dictionary 322. For example, in a case where the tag name is not stored in the buffer D1 of the dynamic dictionary 322, the encoding unit 311 stores the tag name to the buffer D1 and stores the storage position where the tag name is stored and the data length in the address table D2. The encoding unit 311 encodes the stored tag name to a dynamic code in the address table D2 associated with the tag name. In a case where the tag name is stored in the buffer D1 of the dynamic dictionary 322, the encoding unit 311 encodes the tag name to the dynamic code corresponding to the tag name.

Here, it is assumed that a tag name "<context>" of a start tag be registered to the static dictionary 321. Then, the encoding unit 311 encodes the tag name "<context>" to a static code "xxx1$_h$" registered in the static dictionary 321.

Then, the index generation unit 113A stores the encoded encoding code "xxx1$_h$" in an area of the encoded data.

Then, the index generation unit 113A sets a bit at a block appearance position of the encoding code of the tag name for the tag name of the start tag of the block. Here, the index generation unit 113A registers the encoding code "xxx1$_n$" for the tag name "<context>" of the start tag in the third block to the tag layer. Then, the index generation unit 113A sets a bit at the appearance position of the encoding code for the tag name in the block to "1" (ON) with respect to the tag name of the start tag.

Then, the index generation unit 113A stores a block number and an address in the encoded data in association with each other in the block table 121A for the selected block. Here, the index generation unit 113A stores a block number "3" and an address "355" in the encoded data in the block table 121A in association with each other.

Figure 19B:
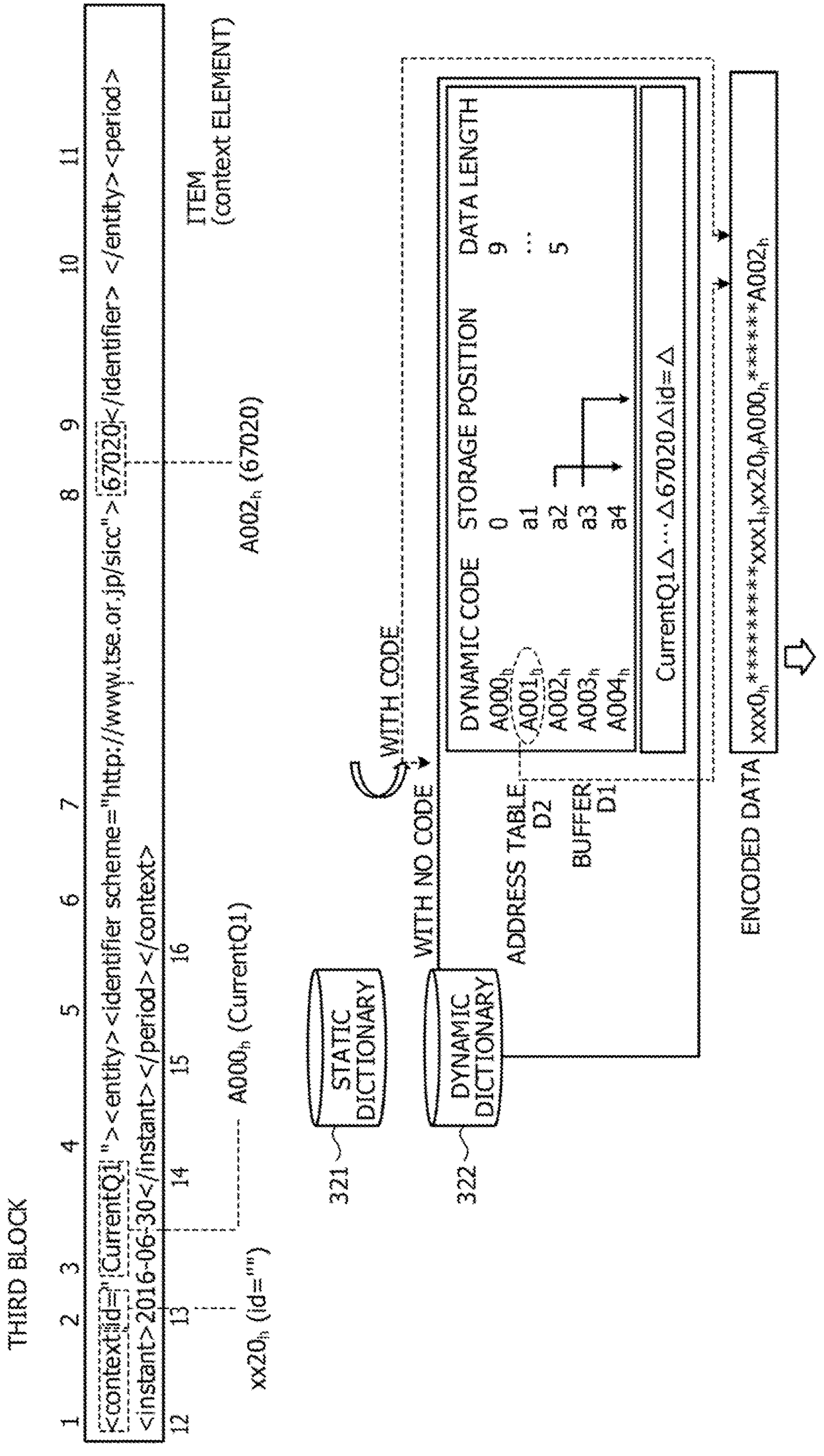

FIGS. 19B and 19C are a diagram illustrating an example of a flow of index generation processing of the lower index according to the second embodiment. Here, processing for generating a lower index in a third block in the XBRL data will be described. In the third block, a lower index of the context element is generated.

As illustrated in FIG. FIGS. 19B and 19C, when detecting a tag, the index generation unit 113A makes the encoding unit 311 encode a tag name of the tag. Here, when detecting the tag, the index generation unit 113A makes the encoding unit 311 encode the tag name "<context>" of the tag. The tag name "<context>" is encoded to the dynamic code "xxxh".

Then, the index generation unit 113A stores the encoded encoding code in an area of the encoded data. In a case where the tag is the start tag of the block, the index generation unit 113A does not execute processing for storing the encoding code for the start tag in the area of the encoded data. This is because the encoding code for the start tag is already stored in the area of the encoded data in the upper index generation processing.

Then, the index generation unit 113A sets a bit at a block appearance position of the encoding code of the tag name for the tag name of the tag.

When detecting the attribute name, the index generation unit 113A makes the encoding unit 311 encode the attribute name. Here, when detecting "id=" as the attribute name, the index generation unit 113A makes the encoding unit 311 encode the attribute name "id=". Since the attribute name "id=" is registered to the static dictionary 321, the attribute name "id=" is encoded to a static code "xx20$_h$".

Then, the index generation unit 113A stores the encoded encoding code in an area of the encoded data.

Then, the index generation unit 113A sets a bit at a at a block appearance position of the encoding code of the attribute name for the attribute name. Here, the index generation unit 113A registers the encoding code "xx20$_h$" for the attribute name "id=" to the attribute layer. Then, the index generation unit 113A sets a bit at the appearance position of the block of the encoding code "xx20h" for the attribute name to "1" (ON) with respect to the attribute name "id=".

Furthermore, when detecting the attribute value, the index generation unit 113A makes the encoding unit 311 encode the attribute value. It is assumed that the attribute value "CurrentQ1" " be not registered to the static dictionary 321. Then, since the attribute value "CurrentQ1" is not stored in the buffer D1 of the dynamic dictionary 322, the attribute value is registered to the dynamic dictionary 322 and is encoded to a dynamic code corresponding to the registered attribute value based on the address table D2. In a case where the attribute value "CurrentQ1" is registered to the dynamic dictionary 322, the encoding unit 311 encodes the attribute value to the corresponding dynamic code based on the address table D2. Here, the attribute value "CurrentQ1" is encoded to the dynamic code "A000".

Then, the index generation unit 113A stores the encoded encoding code in an area of the encoded data.

Then, the index generation unit 113A sets a bit at the block appearance position of the encoding code of the attribute value for the attribute value. Here, the index generation unit 113A registers the encoding code "A000$_h$" for the attribute value "CurrentQ1" to the data value layer. Then, the index generation unit 113A sets a bit at the appearance position of the block of the encoding code "A000h" for the attribute value to "1" (ON) with respect to the attribute value "CurrentQ1".

In addition, when detecting the element value, the index generation unit 113A makes the encoding unit 311 encode the element value. It is assumed that the element value "67020" be not registered to the static dictionary 321. Then, since the element value "67020" is not stored in the buffer D1 of the dynamic dictionary 322, the element value is registered to the dynamic dictionary 322 and is encoded to a dynamic code corresponding to the registered element value based on the address table D2. In a case where the element value "67020" is registered to the dynamic dictionary 322, the encoding unit 311 encodes the element value to the corresponding dynamic code based on the address table D2. Here, the element value "67020" is encoded to a dynamic code "A002$_h$".

Then, the index generation unit 113A stores the encoded encoding code in an area of the encoded data.

Then, the index generation unit 113A sets a bit at a block appearance position of the encoding code for the element value with respect to the element value. Here, the index generation unit 113A registers the encoding code "A002$_h$" for the element value "67020" to the data value layer. Then, the index generation unit 113A sets a bit at the block appearance position of the encoding code "A002h" for the element value to "1" (ON) with respect to the attribute value "67020".

[Flowchart of Index Generation Processing]

Figure 20A:
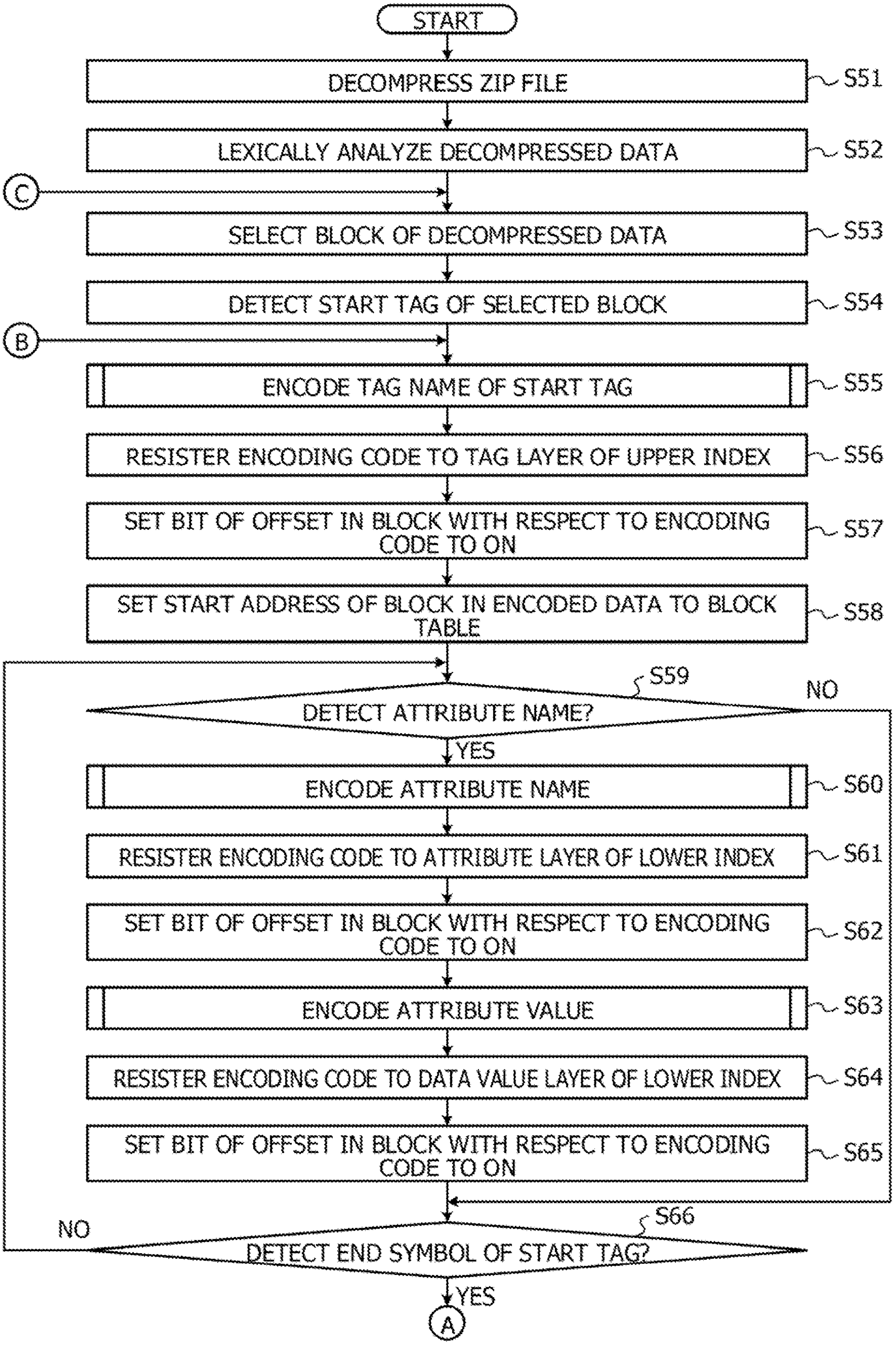
FIGS. 20A and 20B are a diagram illustrating an example of a flowchart of index generation processing according to the second embodiment.
Figure 20B:
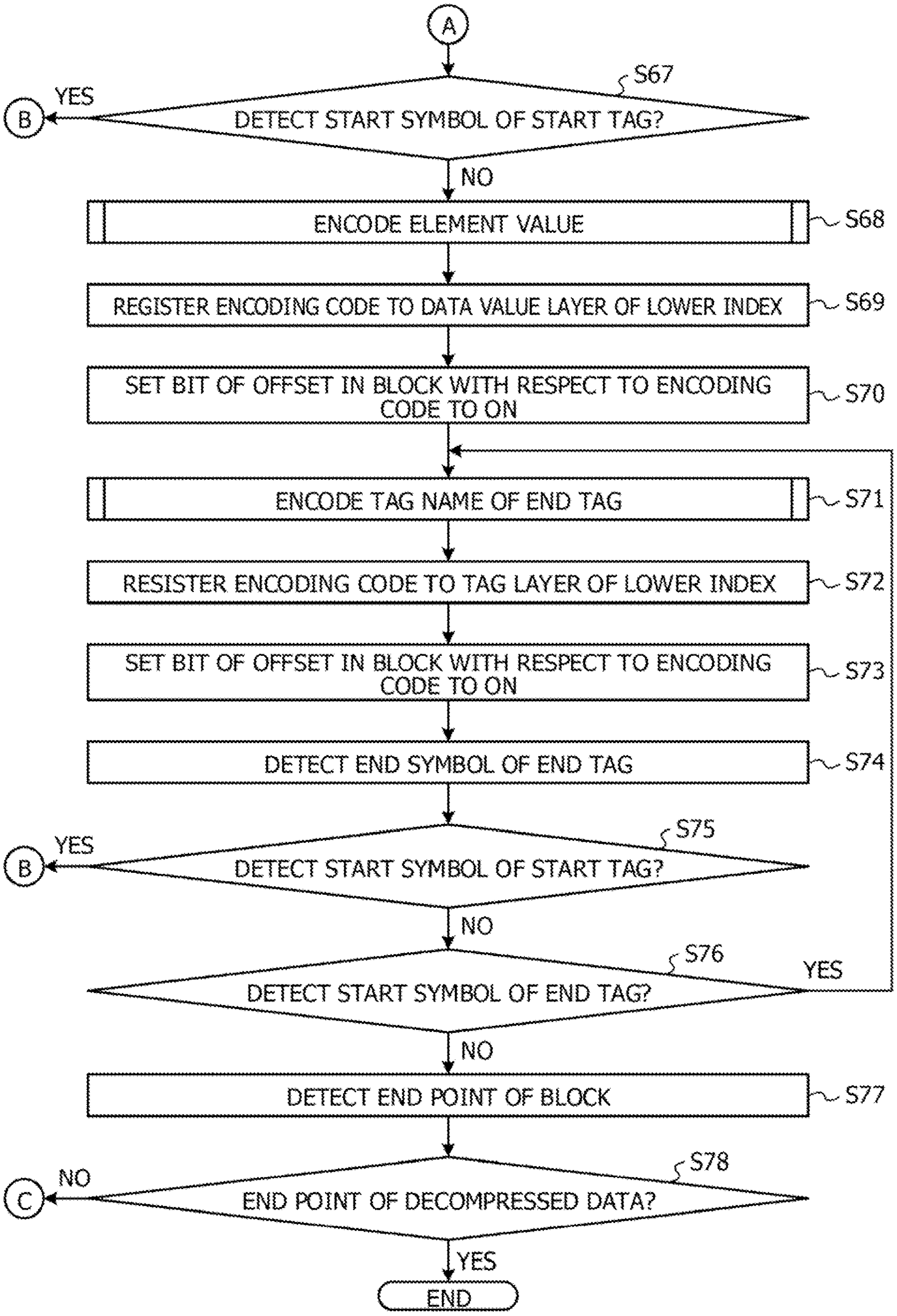

FIGS. 20A and 20B are a diagram illustrating an example of a flowchart of index generation processing according to the second embodiment. The compressed XBRL data will be described as a Zip file.

A decompression unit 111 which has received a Zip file decompresses the Zip file (step S51). A lexical analysis unit 112 lexically analyzes the decompressed data (step S52).

Subsequently, the index generation unit 113A selects a block of the decompressed data (step S53). The index generation unit 113A detects a start tag of the selected block (step S54). Then, the index generation unit 113A encodes a tag name of the detected start tag (step S55). A flowchart of the encoding processing will be described later.

Then, the index generation unit 113A registers the encoded encoding code to a tag layer of the index information 122A$_U$ of the upper index (step S56). The index generation unit 113A sets a bit of a block number of the selected block to ON with respect to the encoding code for the tag name of the start tag detected in the index information 122A$_U$ of the upper index (step S57).

Then, the index generation unit 113A sets a start address of the block in the encoded data to the block table 121A (step S58).

Then, the index generation unit 113A determines whether or not the attribute name is detected in the selected block (step S59) In a case where it is determined that the attribute name is detected (Yes in step S59), the index generation unit 113A encodes the detected attribute name (step S60). A flowchart of the encoding processing will be described later.

Then, the index generation unit 113A registers the encoded encoding code to the attribute layer of the index information 122A$_L$ of the lower index with respect to the selected block (step S61). Then, the index generation unit 113A sets a bit of the offset in the block for the encoding code of the detected attribute name to ON in the index information 122A$_L$ of the lower index with respect to the selected block (step S62).

Then, the index generation unit 113A encodes the attribute value (step S63). A flowchart of the encoding processing will be described later. Then, the index generation unit 113A registers the encoded encoding code to the data value layer of the index information 122A$_L$ of the lower index with respect to the selected block (step S64). Then, the index generation unit 113A sets a bit of the offset in the block for the encoding code of the attribute value to ON in the index information 122A$_L$ of the lower index with respect to the selected block (step S65). Then, the index generation unit 113A proceeds the procedure to step S66.

On the other hand, in a case where it is determined that the attribute name is not detected (No in step S59), the index generation unit 113A determines whether or not the end symbol of the start tag is detected (step S66). In a case where it is determined that the end symbol of the start tag is not detected (No in step S66), the index generation unit 113A proceeds the procedure to step S59 so as to detect a next attribute name.

On the other hand, in a case where it is determined that the end symbol of the start tag is detected (Yes in step S66), the index generation unit 113A determines whether or not the start symbol of the start tag is detected (step S67). In a case where it is determined that the start symbol of the start tag is detected (Yes in step S67), the index generation unit 113A proceeds the procedure to step S55.

On the other hand, in a case where it is determined that the start symbol of the start tag is not detected (No in step S67), the index generation unit 113A encodes the element value (step S68). A flowchart of the encoding processing will be described later. Then, the index generation unit 113A registers the encoded encoding code to the data value layer of the index information 122A$_L$ of the lower index with respect to the selected block (step S69). Then, the index generation unit 113A sets a bit of the offset in the block for the encoding code of the element value to ON in the index information 122A$_L$ of the lower index with respect to the selected block (step S70).

Then, the index generation unit 113A encodes a tag name of an end tag (step S71). A flowchart of the encoding processing will be described later. Then, the index generation unit 113A registers the encoded encoding code to the tag layer of the index information 122A$_L$ of the lower index with respect to the selected block (step S72). The index generation unit 113A sets a bit of the offset in the block for an encoding code of a tag name of an end tag to ON in the index information 122A$_L$ of the lower index with respect to the selected block (step S73), Then, the index generation unit 113A detects the end symbol of the end tag (step S74).

Then, the index generation unit 113A determines whether or not the start symbol of the start tag is detected (step S75). In a case where it is determined that the start symbol of the start tag is detected (Yes in step S75), the index generation unit 113A proceeds the procedure to step S55.

On the other hand, in a case where it is determined that the start symbol of the start tag is not detected (No in step S75), the index generation unit 113A determines whether or not the start symbol of the end tag is detected (step S76). In a case where it is determined that the start symbol of the end tag is detected (Yes in step S76), the index generation unit 113A proceeds the procedure to step S71.

On the other hand, in a case where it is determined that the start symbol of the end tag is not detected (No in step S76), the index generation unit 113A detects an end point of the block (step S77). Then, the index generation unit 113A determines whether the block is an end point of the decompressed data (step S78). In a case where it is determined that the block is not the end point of the decompressed data (No in step S78), the index generation unit 113A proceeds the procedure to step S53 so as to select a next block.

On the other hand, in a case where it is determined that the block is the end point of the decompressed data (Yes in step S78), the index generation unit 113A terminates the index generation processing.

Figure 20C:
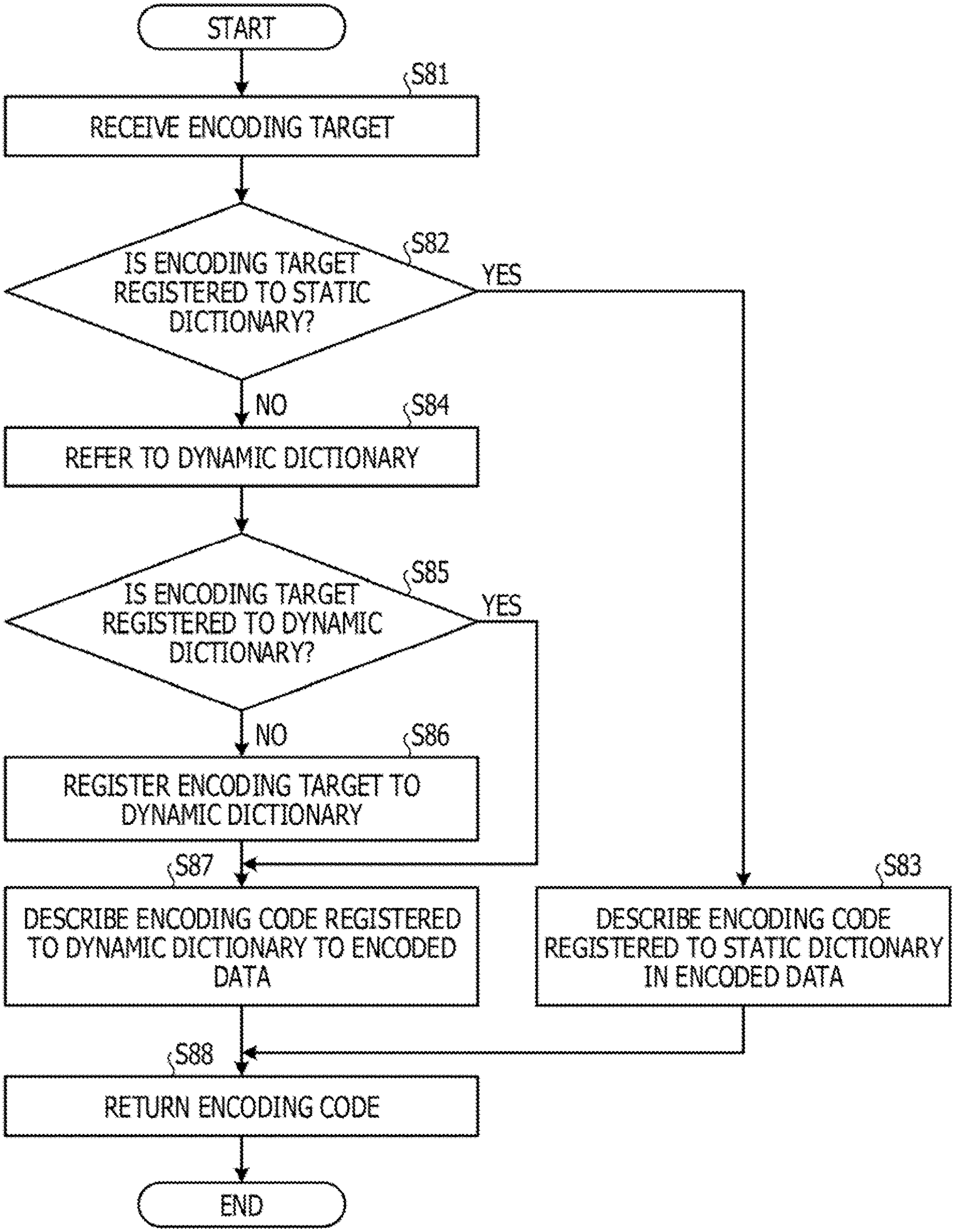
FIG. 20C is a diagram illustrating an example of a flowchart of encoding processing according to the second embodiment.

FIG. 20C is a diagram illustrating an example of a flowchart of the encoding processing according to the second embodiment.

As illustrated in FIG. 20C, when receiving an encoding target (step S81), the encoding unit 311 determines whether or not the encoding target is registered to the static dictionary 321 (step S82). When it is determined that the encoding target is registered to the static dictionary 321 (Yes in step S82), the encoding unit 311 describes an encoding code registered to the static dictionary 321 in the encoded data (step S83). Then, the encoding unit 311 proceeds the procedure to step S88.

On the other hand, when it is determined that the encoding target is not registered to the static dictionary 321 (No in step S82), the encoding unit 311 refers to the dynamic dictionary 322 (step S84). Then, the encoding unit 311 determines whether or not the encoding target is registered to the dynamic dictionary 322 (step S85).

In a case where it is determined that the encoding target is registered to the dynamic dictionary 322 (Yes in step S85), the encoding unit 311 proceeds the procedure to step S87.

On the other hand, in a case where it is determined that the encoding target is not registered to the dynamic dictionary 322 (No in step S85), the encoding unit 311 registers the encoding target to the dynamic dictionary 322 (step S86). Then, the encoding unit 311 proceeds the procedure to step S87.

In step S87, the encoding unit 311 describes the encoding code registered to the dynamic dictionary 322 to the encoded data (step S87). Then, the encoding unit 311 proceeds the procedure to step S88.

In step S88, the encoding unit 311 returns the encoding code to the index generation processing (step S88). Then, the encoding unit 311 terminates the encoding processing.

[Configuration of Search Device According to Second Embodiment]

Figure 21:
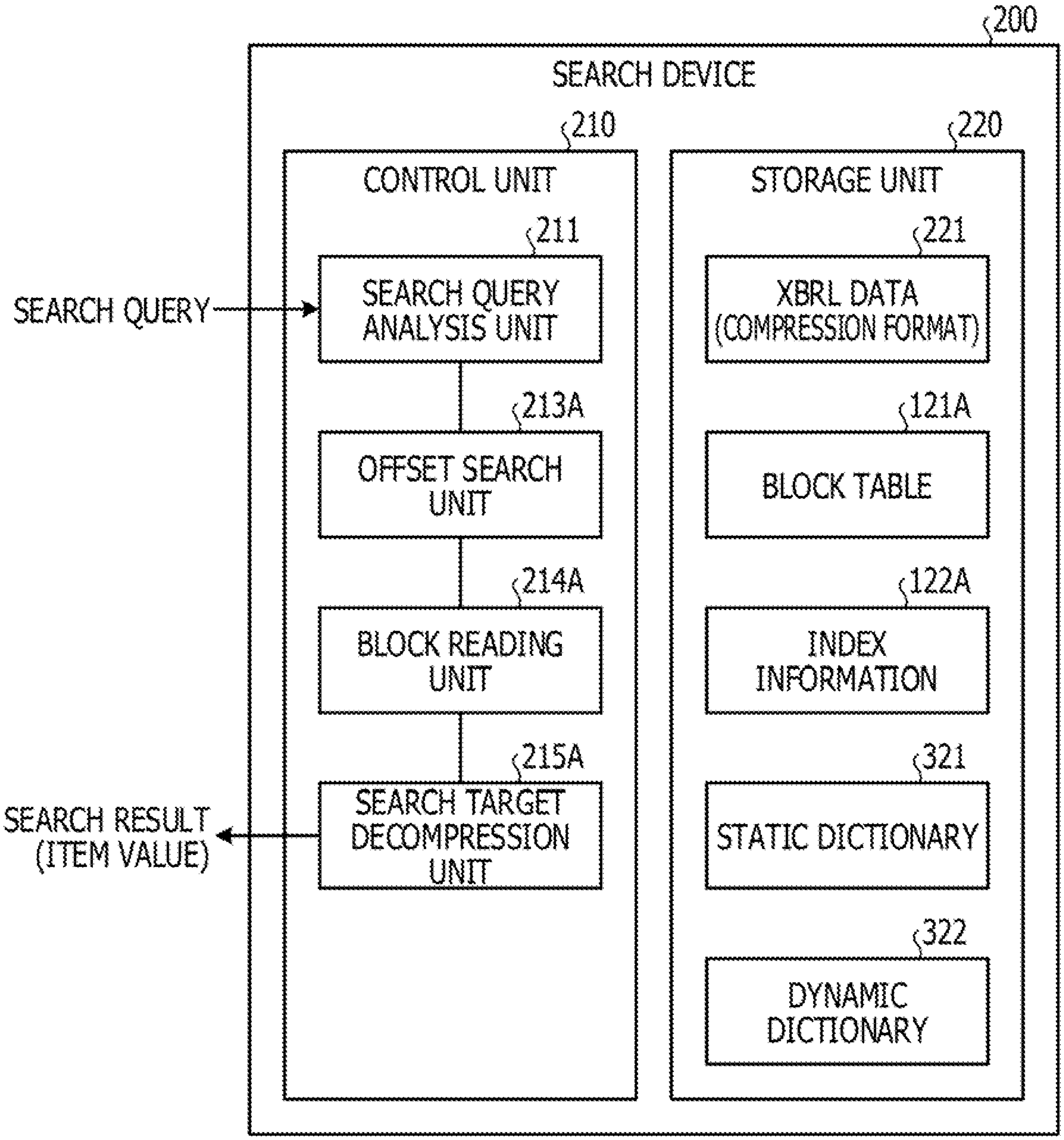
FIG. 21 is a block diagram illustrating a functional configuration of a search device according to the second embodiment.

FIG. 21 is a block diagram illustrating a functional configuration of a search device according to the second embodiment. A component having the same configuration as the search device 200 illustrated in FIG. 10 is denoted with the same reference numeral, and the description regarding the overlapped configurations and operations will be omitted. A difference between the first embodiment and the second embodiment is that the decompression unit 212 is removed. Furthermore, the difference between the first embodiment and the second embodiment is that the offset search unit 213, the block reading unit 214, and the search target extraction unit 215 are respectively changed to an offset search unit 213A, a block reading unit 214A, and a search target decompression unit 215A, In addition, the difference between the first embodiment and the second embodiment is that the block table 121 and the index information 122 are respectively changed to a block table 121A and index information 122A. Then, the difference between the first embodiment and the second embodiment is that a static dictionary 321 and a dynamic dictionary 322 are added. The block table 121A, the index information 122A, and the dynamic dictionary 322 are information generated by the index generation device 100 according to the second embodiment and, for example, acquired via a network and stored in a storage unit 220.

The offset search unit 213A refers to the index information 122A and searches for a search target that matches a search condition. For example, the offset search unit 213A refers to the index information $122A_U$ of the upper index and extracts an index (bitmap) corresponding to the encoding code of the element name of the search condition. The offset search unit 213A acquires a block number in which "1" is set to the extracted bitmap. The offset search unit 213A extracts the index information $122A_L$ of the lower index corresponding to the detected block number. The offset search unit 213A refers to the extracted index information $122A_L$ of the lower index and narrows an offset of the search target which matches the search condition.

The block reading unit 214A reads a block corresponding to the acquired block number from the encoded data. For example, the block reading unit 214A refers to the block table 121A and acquires an address 121*c* in the encoded data corresponding to the acquired block number. The block reading unit 214A reads a block associated with the acquired address from the encoded data.

The search target decompression unit 215A extracts a search target from the target block and decompresses the extracted search target. For example, the search target decompression unit 215A extracts a search target of the offset narrowed by the offset search unit 213A from the block read by the block reading unit 214A. Then, the search target decompression unit 215A decompresses the extracted search target based on the static dictionary 321 and the dynamic dictionary 322.

As an example of decompression processing, the search target decompression unit 215A determines whether or not the extracted search target is a dynamic code. When determining that the extracted search target is a dynamic code, the search target decompression unit 215A decompresses the search target by using the dynamic dictionary 322. That is, the search target decompression unit 215A specifies the dynamic code that matches the search target from the address table D2 of the dynamic dictionary 322 and acquires a storage position and a data length corresponding to the specified dynamic code. Then, the search target decompression unit 215A specifies a character string indicating the acquired storage position and data length from the buffer D, The specified character string is a search result obtained by decompressing the search target.

[Flow of Search Target Decompression Processing]

Figure 22:
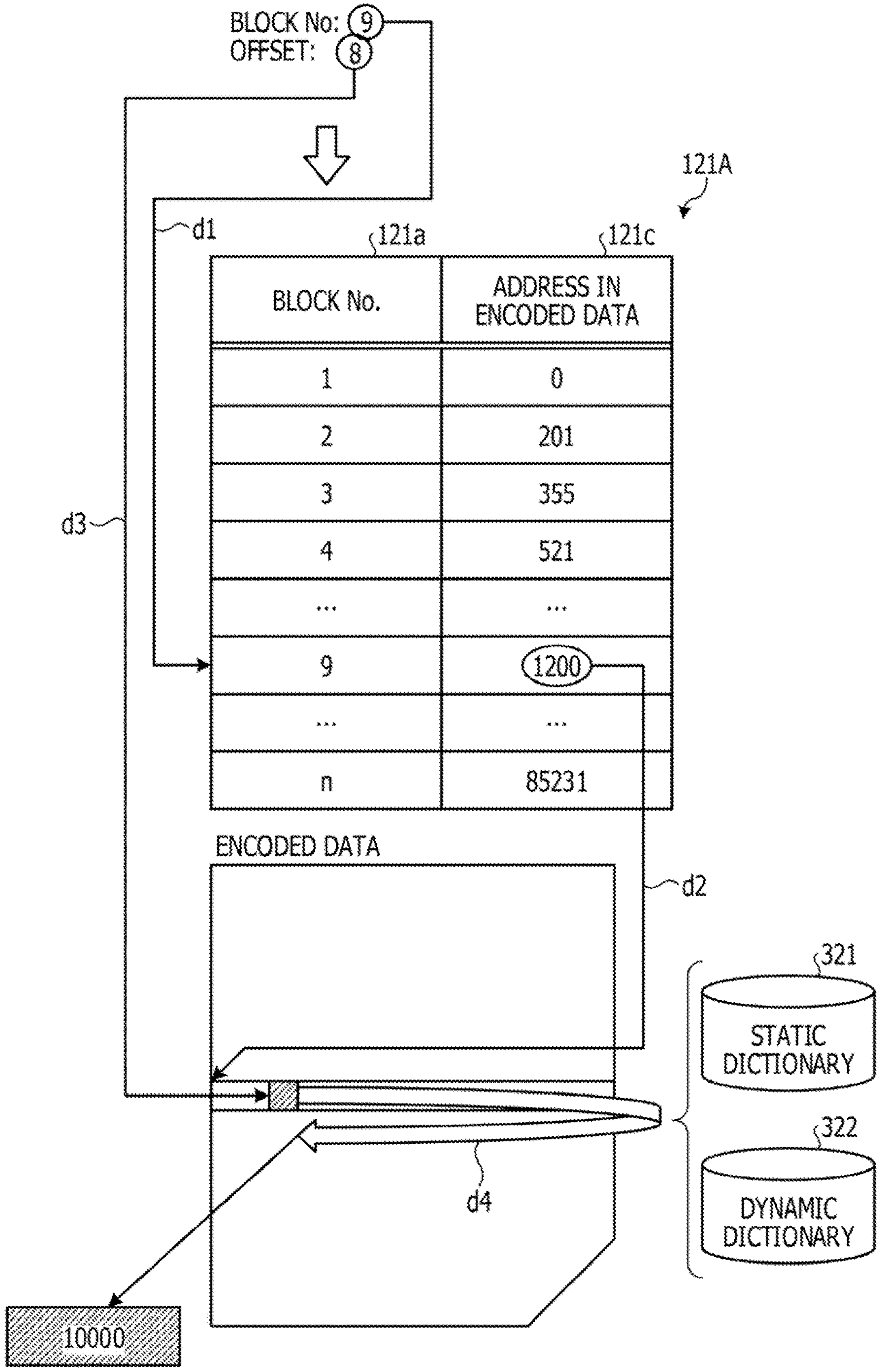
FIG. 22 is a diagram illustrating an example of a flow of search target decompression processing according to the second embodiment.

Here, an example of a flow of search target decompression processing according to the second embodiment will be described with reference to FIG. 22, FIG. 22 is a diagram illustrating an example of the flow of the search target decompression processing according to the second embodiment, A case will be described where the offset search unit 213A acquires "9" as a block number and searches for "8" as an offset.

The block reading unit 214A acquires an address 121*c* in the encoded data corresponding to the acquired block number from the block table 121A (d1). Here, "1200" is acquired as the address 121*c* in the encoded data corresponding to the acquired block number "9".

Then, the block reading unit 214A reads a block associated with the acquired address "1200" from the encoded data (d2).

Subsequently, the search target decompression unit 215A extracts a search target of the searched offset from the block read by the block reading unit 214A (d3). Here, it is assumed that the search target decompression unit 215A extract an encoding code "A083" as a search target at the position of "8" which is searched as an offset from the read block. It is assumed that "$A083_h$" be allocated to "10000" in the dynamic dictionary 222. Then, the search target decompression unit 215A decompresses the extracted encoding code "$A083_h$" based on the static dictionary 321 and the dynamic dictionary 322. Here, since the encoding code "$A083_h$" is registered to the dynamic dictionary 322, the search target decompression unit 215A decompresses "$A083_h$" to "10000" based on the dynamic dictionary 322. Then, the search target decompression unit 215A outputs the decompressed "10000" as a search result (d4).

[Flowchart of Search Processing]

Figure 23:
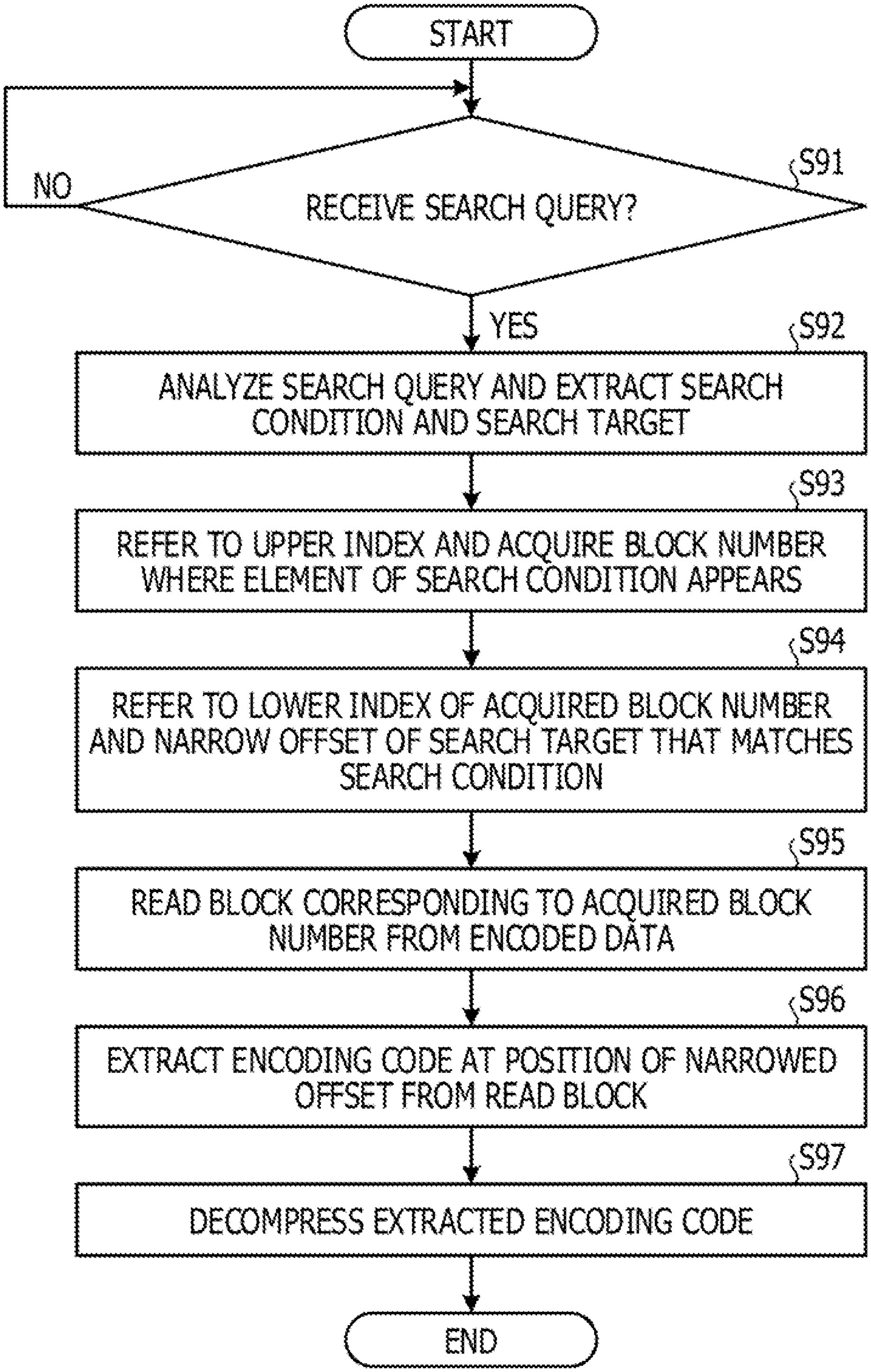
FIG. 23 is a diagram illustrating an example of a flowchart of search processing according to the second embodiment.

FIG. 23 is a diagram illustrating an example of a flowchart of search processing according to the second embodiment.

The search query analysis unit 211 determines whether or not a search query is received (step S91). In a case where it is determined that the search query is not received (No in step S91), the search query analysis unit 211 repeats determination processing until the search query is received.

On the other hand, in a case where it is determined that the search query is received (Yes in step S91), the search query analysis unit 211 analyzes the search query and extracts a search condition and a search target (step S92).

Subsequently, the offset search unit 213A refers to the index information 122$A_U$ of the upper index and acquires a block number corresponding to an element name of the search condition (step S93). Then, the offset search unit 213A refers to the index information 122$A_L$ of the lower index of the acquired block number and narrows an offset of the search target that matches the search condition (step S94).

Subsequently, the block reading unit 214A reads a block corresponding to the acquired block number from the encoded data (step S95) For example, the block reading unit 214A refers to the block table 121A, acquires an address 121*c* in the encoded data corresponding to the acquired block number, and reads a block corresponding to the acquired address 121*c* in the encoded data from the encoded data. Then, the search target decompression unit 215A extracts an encoding code located at a position of the narrowed offset from the read block (step S96).

Then, the search target decompression unit 215A decompresses the extracted encoding code based on the static dictionary 321 and the dynamic dictionary 322 (step S97). Then, the search target decompression unit 215A outputs the decompressed value as the search result and terminates the search processing.

[Example of Search Flow According to Second Embodiment]

Figure 24:
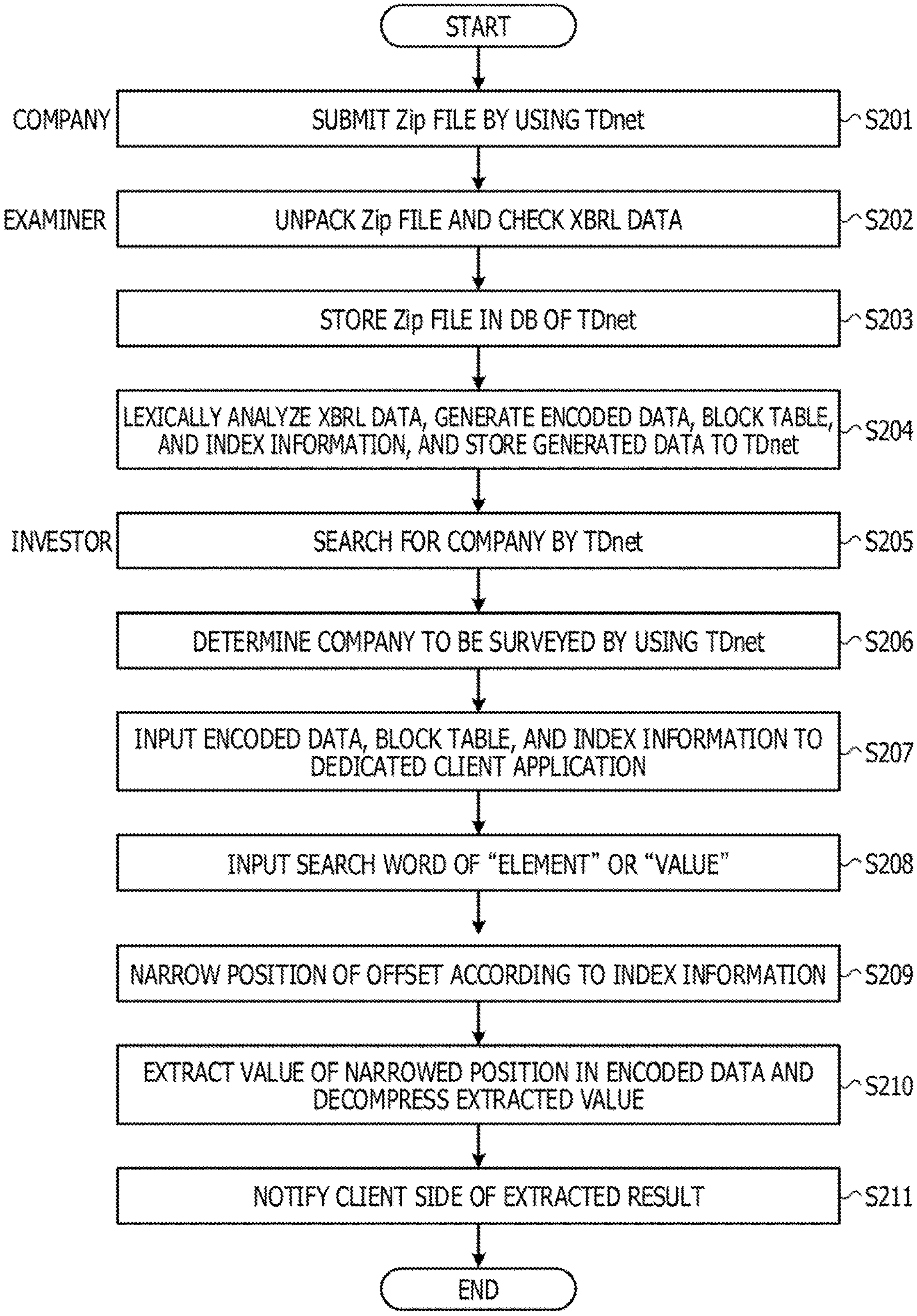
FIG. 24 is a diagram illustrating an example of a search flow according to the second embodiment.

FIG. 24 is a diagram illustrating an example of a search flow according to the second embodiment. In addition, in FIG. 24, a case will be described where the TDnet is used so as to compare the search flow with the search flow in the reference example illustrated in FIG. 26. However, the search flow is not limited to the search flow using the TDnet.

As illustrated in FIG. 24, a company submits a Zip file obtained by compressing XBRL data of financial information by Zip by using the TDnet (S201).

On the side of the examiner, the examiner unpacks (decompress) the Zip file and checks the decompressed XBRL data (S202). The examiner stores the Zip file of the approved XBRL data in a DB of the TDnet (S203) and discloses the XBRL data. The examiner here is, for example, a financial institution or a stock exchange.

Then, the index generation device 100 lexically analyzes the XBRL data, generates the encoded data, the block table 121A, and the index information 122A, and stores the generated data to the TDnet (S204). Such processing corresponds to, for example, the lexical analysis unit 112, the encoding unit 311, and the index generation unit 113A.

On a side of a client (investor), the investor searches for a company by using the TDnet (S205) and determines a company to be surveyed (S206).

Subsequently, the investor inputs the encoded data, the block table 121A, and the index information 122A to a dedicated client application of the search device 200 (S207).

In addition, the investor inputs a search word of an element to be searched and a search word of a value to be searched to the dedicated client application of the search device 200 (S208). That is, the investor inputs a search query to the search device 200. Then, the dedicated client application analyzes the search query and extracts a search condition and a search target. Such processing corresponds to, for example, the search query analysis unit 211.

Then, the dedicated client application narrows a position of an offset of the search target that matches the search condition according to the index information 122A (S209). The dedicated client application extracts the value of the narrowed position in the encoded data and decompresses the extracted value (S210). Then, the dedicated client application notifies the client side of the decompressed result (S211). Such processing corresponds to, for example, the offset search unit 213A, the block reading unit 214A, and the search target decompression unit 215A.

[Effect of Second Embodiment]

In this way, according to the second embodiment, when encoding the XBRL data, the index generation device 100 generates the index information 122A regarding appearance positions of each of the encoded item and the encoded value for each of the item and the value included in the XBRL data. According to the above configuration, by using the index information 122A, the index generation device 100 can efficiently search for the search target in the XBRL data according to the search condition formed by combining the items and values while encoding the XBRL data. That is, by using the index information 122A, the index generation device 100 can narrow the search target in the encoded format and can narrow the search target without scanning the XBRL data.

Furthermore, in the second embodiment, the search device 200 refers to the index information 122A that is generated when the XBRL data is encoded and specifies the appearance positions of the specific item and the specific value included in the search condition. Then, the search device 200 searches for partial data existing at the specified appearance position from the encoded data and partially decompresses the searched partial data. According to the above configuration, the verification device 200 can search for the partial data indicating the search target in the encoded format.

[Others]

In the first and second embodiments, it has been described that the index information 122 includes the index information 122$_U$ of the upper index and the index information 122$_L$ of the lower index. Then, the X axis of the index information 122$_U$ of the upper index indicates the block number, and the Y axis indicates the tag name (element name) of the tag layer. The X axis of the index information 122$_L$ of the lower index indicates the offset (appearance position) in block units, and the Y axis indicates the tag name included in the tag layer, the attribute name included in the attribute layer, and the data value included in the data value layer. However, the index information 122 is not limited to this, and may be three-dimensionally expressed. That is, in the index information 122, the X axis may indicate the block number, the Y axis may indicate the tag name included in the tag layer, the attribute name included in the attribute layer, and the data value included in the data value layer, and the Z axis may indicate the offset (appearance position) in block units.

In addition, each component of the illustrated device is not necessarily physically configured as illustrated in the drawings. That is, specific aspects of separation and integration of the device are not limited to the illustrated ones, and all or a part of the apparatus can be functionally or physically separated and integrated in an arbitrary unit according to various loads, use states, and the like. For example, the index generation unit 113 may separate the processing for generating the index information 122$_U$ of the upper index and the processing for generating the index information 122$_L$ of the lower index. Furthermore, the offset search unit 213 may distribute the processing for acquiring the block number from the index information 122$_U$ of the upper index and the processing for narrowing the offset from the index information 122$_L$ of the lower index. In addition, the storage unit 120 may be connected via a network as an external device of the index generation device 100. The storage unit 220 may be connected via a network as an external device of the search device 200.

Figure 25:
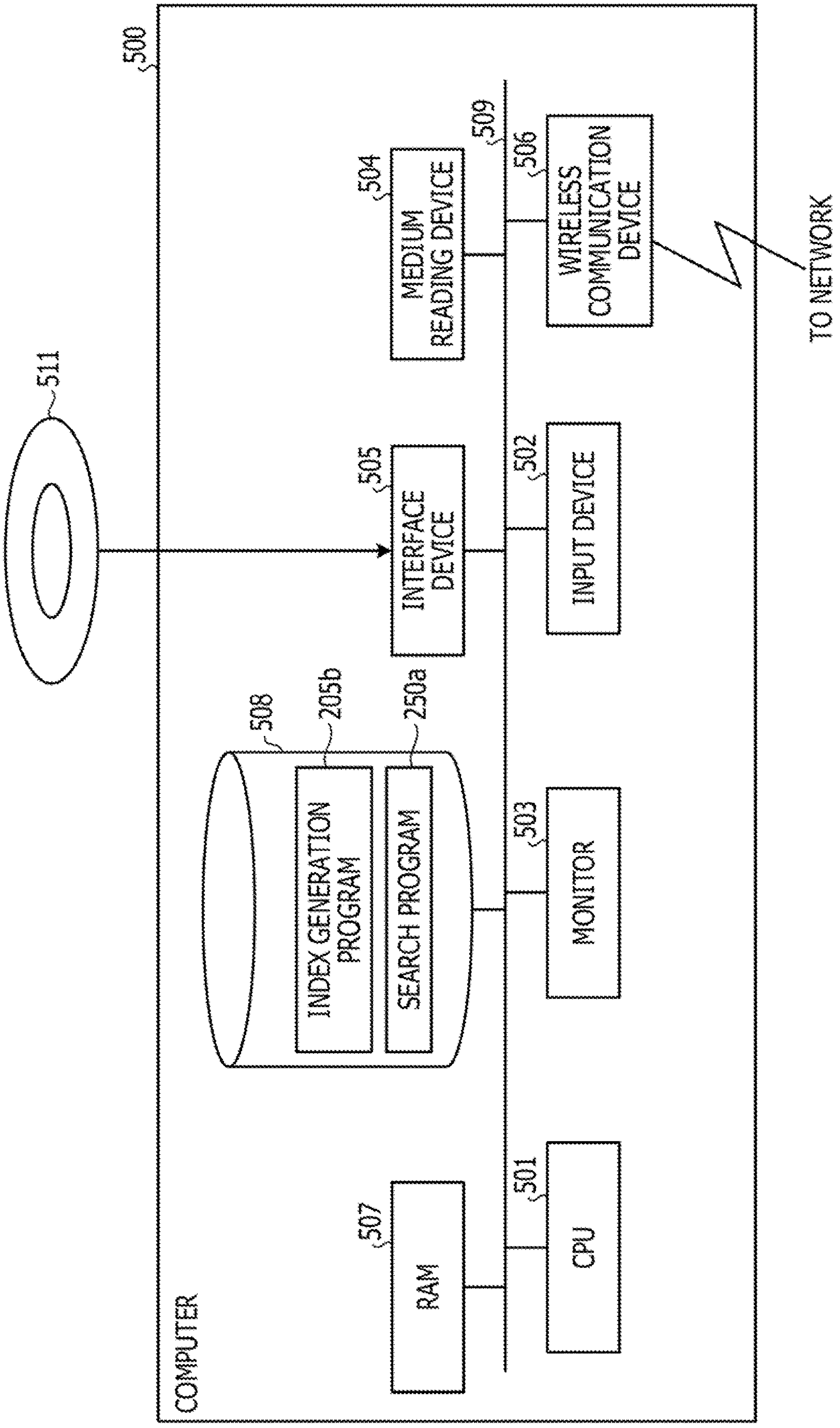
FIG. 25 is a diagram illustrating an example of a hardware configuration of the index generation device and the search device.

FIG. 25 is a diagram illustrating an example of a hardware configuration of the index generation device and the search device. As illustrated in FIG. 25, a computer 500 including the index generation device 100 and the search device 200 includes a CPU 501 that executes various arithmetic processing, an input device 502 that receives a data input from a user, and a monitor 503. The computer 500 further includes a medium reading device 504 that reads a program and the like from a storage medium, an interface device 505 that connects to the other device, and a wireless communication device 506 that wirelessly connects to the other device. The computer 500 further includes a Random Access Memory (RAM) 507 that temporarily stores various information and a hard disk device 508. Each of the devices 501 to 508 is connected to a bus 509.

The hard disk device 508 stores an index generation program 205*b* having a similar function to the control unit 110 illustrated in FIG. 1. In addition, the hard disk device 508 stores various data used to implement the index generation program 205*b*. The various data includes data in the storage unit 120 illustrated in FIG. 1. The hard disk device 508 stores a search program 205*a* having a similar function to the control unit 210 illustrated in FIG. 10. In addition, the hard disk device 508 stores various data used to implement the search program 205*a*. The various data includes data in the storage unit 220 illustrated in FIG. 10.

The CPU 501 reads each program stored in the hard disk device 508 and develops and executes the program on the RAM 507 to perform various processing. These programs can make the computer 500 function as the respective functional units illustrated in FIGS. 1 and 10.

It is not necessary for the index generation program 205*b* and the search program 205*a* to be necessarily stored in the hard disk device 508. For example, the computer 500 may read and execute a program stored in a storage medium that can be read by the computer 500. The storage medium that can be read by the computer 500 corresponds to, for example, a portable recording medium such as a CD-ROM, a DVD disk, a Universal Serial Bus (USB) memory, a semiconductor memory such as a flash memory, a hard disk drive, and the like. In addition, it is possible that these programs are stored in a device connected to a public line, the Internet, a Local Area Network (LAN), and the like and the computer 500 reads and executes these programs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium recording an index generation program for causing a computer to execute processing of:

inputting data which is described by a combination of an item including a start tag, an end tag and a tag name placed between the start tag and the end tag and a value including an attribute value and an element value; and generating index information regarding an appearance position of each of the item and the value for each of the item and the value which are included in the data, the generating the index information including an upper index and a lower index includes:

generating the index information is generated regarding appearance positions of each of the item, an attribute, and the value for each of the item, the attribute, and the value which are included in the data, the index information includes an upper index including a first axis indicating a block number of a block included in a file in which a bit is set, when detecting the start tag, for the item in which the tag name follows the start tag and a second axis indicating the item for which the bit is set; and generating the lower index including a first axis indicating an appearance position in the block, which is identified by the block number, of the item for which the bit is set, an attribute name, which is placed before a specific attribute and is included in the block which is identified by the block number, the attribute value, which is placed after the specific attribute and is included in the block which is identified by the block number, and the element value, which follows the end tag and is ahead of the start tag and is included in the block which is identified by the block number, and a second axis indicating the item, the attribute name, the attribute value and the element value, the generating generates index information regarding the appearance position of each of an encoded item and an encoded value for each of the item and the value which are included in the data when the data is encoded.

2. An information processing apparatus comprising:

a memory; and a processor coupled to the memory and configured to:

input data which is described by a combination of an item including a start tag, an end tag and a tag name placed between the start tag and the end tag and a value including an attribute value and an element value; and generate index information regarding an appearance position of each of the item and the value for each of the item and the value which are included in the data, a generation of the index information including an upper index and a lower index includes:

generating the index information is generated regarding appearance positions of each of the item, an attribute, and the value for each of the item, the attribute, and the value which are included in the data, the index information includes an upper index including a first axis indicating a block number of a block included in a file in which a bit is set, when detecting the start tag, for the item in which the tag name follows the start tag and a second axis indicating the item for which the bit is set; and generating the lower index including a first axis indicating an appearance position in the block, which is identified by the block number, of the item for which the bit is set, an attribute name, which is placed before a specific attribute and is included in the block which is identified by the block number, the attribute value, which is placed after the specific attribute and is included in the block which is identified by the block number, and the element value, which follows the end tag and is ahead of the start tag and is included in the block which is identified by the block number, and a second axis indicating the item, the attribute name, the attribute value and the element value, the processor generates index information regarding the appearance position of each of an encoded item and an encoded value for each of the item and the value which are included in the data when the data is encoded.

* * * * *